(12) United States Patent
Ashkenazy et al.

(10) Patent No.: US 10,581,895 B2
(45) Date of Patent: *Mar. 3, 2020

(54) TIME-TAGGED PRE-DEFINED SCENARIOS FOR PENETRATION TESTING

(71) Applicant: XM Cyber Ltd., Hertzelia (IL)

(72) Inventors: Adi Ashkenazy, Tel Aviv (IL); Ronen Segal, Hertzelia (IL); Menahem Lasser, Kohav-Yair (IL)

(73) Assignee: XM Cyber Ltd., Hertsliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/519,124

(22) Filed: Jul. 23, 2019

(65) Prior Publication Data

US 2019/0387015 A1    Dec. 19, 2019

Related U.S. Application Data

(63) Continuation of application No. 15/911,170, filed on Mar. 5, 2018, now Pat. No. 10,412,112.

(60) Provisional application No. 62/522,569, filed on Aug. 31, 2017.

(51) Int. Cl.
*H04L 29/06* (2006.01)
*H04L 12/24* (2006.01)
*G06F 3/0482* (2013.01)
*H04L 12/26* (2006.01)

(52) U.S. Cl.
CPC ........ *H04L 63/1433* (2013.01); *G06F 3/0482* (2013.01); *H04L 41/22* (2013.01); *H04L 43/045* (2013.01); *H04L 43/50* (2013.01); *H04L 63/1458* (2013.01)

(58) Field of Classification Search
None
See application file for complete search history.

(56) References Cited

U.S. PATENT DOCUMENTS 10,068,095 B1 * 9/2018 Segal .................... G06F 21/577
2014/0237606 A1 * 8/2014 Futoransky ........... G06F 21/577
726/25

* cited by examiner

*Primary Examiner* — David Le
(74) *Attorney, Agent, or Firm* — Marc Van Dyke; Momentum IP Group

(57) ABSTRACT

Methods and systems for carrying out campaigns of penetration testing for discovering and reporting security vulnerabilities of a networked system. Penetration testing campaigns are carried out based on pre-defined penetration testing scenarios associated with respective time tags. A penetration testing scenario is selected by a user from a set of pre-defined test scenarios, the set containing only pre-defined test scenarios with time tags matching a scheduled starting time of a penetration testing campaign.

20 Claims, 18 Drawing Sheets

```
TEST SCENARIO SELECTION
Select one of the following
pre-defined test scenarios O 1. Watering hole attack test
O 2. DoS attack test
O 3. Eavesdropping attack test
O 4. Keylogger attack test
O 5. Phishing attack test

SELECT
```

TEST SCENARIO SELECTION
Select <u>one</u> of the following
pre-defined test scenarios ○ 1. Watering hole attack test
○ 2. DoS attack test
○ 3. Eavesdropping attack test
   4. Keylogger attack test
   5. Phishing attack test

SELECT

Fig. 1F

TEST SCENARIO SELECTION
Select <u>one</u> of the following
pre-defined test scenarios ○ 1. Watering hole attack test
○ 2. DoS attack test
○ 3. Eavesdropping attack test

SELECT

Fig. 1G

TEST SCENARIO SELECTION
Select <u>one</u> of the following
pre-defined test scenarios ○ 1. Watering hole attack test
○ 2. DoS attack test
○ 3. Eavesdropping attack test
○ 4. Keylogger attack test
○ 5. Phishing attack test

SELECT

Fig. 1H

TEST SCENARIO SELECTION
Select <u>one</u> of the following
pre-defined test scenarios ○ 1. Watering hole attack test
○ 2. DoS attack test
○ 3. Eavesdropping attack test
○ 4. Keylogger attack test
→ 5. Phishing attack test ←
Scenario unavailable. Please make another selection.

SELECT

Fig. 1J

TIME-TAGGED PRE-DEFINED SCENARIOS FOR PENETRATION TESTING

CROSS-REFERENCE TO RELATED APPLICATIONS

This patent application is a continuation of U.S. patent application Ser. No. 15/911,170, which (i) was filed on Mar. 5, 2018 and (ii) is incorporated herein by reference in its entirety. U.S. patent application Ser. No. 15/911,170 claims the benefit of U.S. Provisional Patent Application No. 62/552,569 filed on Aug. 31, 2017, which is incorporated herein by reference in its entirety.

FIELD OF THE INVENTION

The present invention relates to systems and methods for penetration testing of a networked system, and to user-selectable time-tagged scenarios for conducting time-specific penetration testing campaigns. In particular, the present invention is suitable for improving the efficacy of penetration testing in networked systems, in order to detect weaknesses that would expose network nodes to security vulnerabilities.

BACKGROUND

There is currently a proliferation of organizational networked computing systems. Every type of organization, be it a commercial company, a university, a bank, a government agency or a hospital, heavily relies on one or more networks interconnecting multiple computing nodes. Failures of the networked computing system of an organization or even of only a portion of it might cause significant damage, up to completely shutting down all operations. Additionally, all data of the organization exists somewhere on its networked computing system, including all confidential data comprising its "crown jewels" such as prices, details of customers, purchase orders, employees' salaries, technical formulas, etc. Loss of such data or leaks of such data to outside unauthorized entities might be disastrous for the organization.

As almost all organizational networks are connected to the Internet through at least one computing node, they are subject to attacks by computer hackers or by hostile adversaries. Quite often the newspapers are reporting incidents in which websites crashed, sensitive data was stolen or service to customers was denied, where the failures were the results of hostile penetration into an organization's networked computing system.

As a result, many organizations invest a lot of efforts and costs in preventive means designed to protect their computing networks against potential threats. There are many defensive products offered in the market claiming to provide protection against one or more known modes of attack, and many organizations arm themselves to the teeth with multiple products of this kind.

However, it is difficult to tell how effective such products really are in achieving their stated goals of blocking hostile attacks, and consequently most CISO's (Computer Information Security Officers) will admit (maybe only off the record), that they don't really know how well they can withstand an attack from a given adversary. The only way to really know how strong and secure a system is, is by trying to attack it as a real adversary would. This is known as red-teaming or penetration testing (pen testing, in short), and is a very common approach that is even required by regulation in some developed countries.

Penetration testing requires highly talented people to man the red team. Those people should be familiar with each and every publicly known vulnerability and attacking method and should also have a very good familiarity with networking techniques and multiple operating systems implementations. Such people are hard to find and therefore many organizations give up establishing their own red teams and resort to hiring external expert consultants for carrying out that role (or completely give up penetration testing). But external consultants are expensive and therefore are typically called in only for brief periods separated by long intervals in which no such testing is done. This makes the penetration testing ineffective as vulnerabilities caused by new attacks that appear almost daily are discovered only months after becoming serious threats to the organization.

Additionally, even rich organizations that can afford hiring talented experts as in-house red teams do not achieve good protection. Testing for vulnerabilities of a large network containing many types of computers, operating systems, network routers and other devices is both a very complex and a very tedious process. The process is prone to human errors of missing testing for certain threats or misinterpreting the damages of certain attacks. Also, because a process of full testing against all threats is quite long, the organization might again end with a too long discovery period after a new threat appears.

Because of the above difficulties, several vendors are proposing automated penetration testing systems. Such systems automatically discover and report vulnerabilities of a networked system, potential damages that might be caused to the networked system, and potential trajectories of attack that may be employed by an attacker.

Before using an automated penetration testing system for running a test of a networked system, a user of the penetration testing system (which may be a CISO of the organization, an administrator, a member of a red team, etc.) typically selects a pre-defined scenario that specifies values for the information items of the test and then launches a campaign based on that scenario. For example, the pre-defined scenario may specify that the attacker is a state-sponsored organization having high expertise and unlimited resources. The pre-defined scenario may also specify that the goal of the attacker is to export as many Excel files as possible out of the networked system. It may also specify that the lateral movement strategy of the attacker is "depth-first", meaning that the attacker will prefer penetrating deeper and deeper into the tested networked system rather than systematically compromising all network nodes that are closest to its initial penetration point Similarly, there are many other information items that may be specified by the pre-defined scenario which will affect the execution of any penetration testing campaign based on the scenario.

Pre-defined scenarios are typically delivered by the provider of the automated penetration testing system. The provider may provide an initial library of pre-defined scenarios when delivering the testing system, and then may upgrade it with additional pre-defined scenarios from time to time.

Some providers deliver a scenario editor together with the penetration testing system, with the scenario editor enabling the user to create his own pre-defined scenarios and add them to the library. Optionally, the scenario editor may also edit and change previously-existing pre-defined scenarios.

DRAWBACKS OF PRIOR-ART SYSTEMS

In prior art penetration testing systems, the pre-defined scenarios are calendar-time-agnostic. In other words, a given pre-defined scenario may always be selected to be executed with no restrictions imposed by the current calendar time. (Note that we refer to "calendar time" and not to "relative time". A prior art pre-defined scenario may impose a time limit on the execution of the test—for example, specifying the test should be terminated after five hours of execution, regardless of what is the status of the penetration attempt at that time).

As a result of pre-defined scenarios being calendar-time-agnostic, there are testing use cases that are not optimally served.

As a first example, consider a CISO that wants to test his networked system vulnerability against a "watering hole" attack. In such attack, the potential victims are a group of users (for example, all the employees of the organization whose networked system is being tested). The attacker guesses or observes which servers are frequently accessed by the group members, and infects one or more of them with malware. Eventually, some member(s) of the targeted group gets infected when accessing an infected server. The CISO suspects that some of the employees frequently submit queries to a given public database server he knows to be easily compromised by attackers. For verifying his suspicion, he creates (or obtains from the penetration testing system vendor) a pre-defined scenario that detects the sending of such queries, and then launches a campaign based on that scenario. He then determines that any network node detected during the campaign to submit a query to the given database server is compromisable by the attacker.

However, if that campaign is being executed outside of the organization's working hours, then it will always report that no node is compromisable. As the compromising depends on users manually initiating queries to the given database server and as there are almost no users present outside working hours, executing a campaign based on the pre-defined scenario during those hours is pointless. This pre-defined scenario should only be used during working hours. But once the pre-defined scenario is created and placed in the library, a user who is not familiar with its purpose might pick it for use at night. In such case, not only is that user wasting testing time, but he might reach an incorrect conclusion. He might conclude that the tested networked system is not vulnerable to watering hole attacks, while in reality it is vulnerable to watering hole attacks if carried out during working hours.

As a second example, an administrator may want to test the vulnerability of a specific server of the organization against a Denial-Of-Service (DOS) attack. In a DOS attack, the attacker bombards a server with numerous service requests, causing it to exhaust its resources and thus deny service from legitimate customers which are trying to use it. The user may obtain a pre-defined scenario that emulates the DOS attack and place it in the library. However, it may be the case that during working hours of the organization the computing device hosting the service is also used for providing other services to the employees of the organization. In such case, if a campaign based on that scenario is executed within the organization's working hours, the server's resources will be exhausted much sooner than if the campaign is executed outside of the working hours. Therefore, using that scenario at night might provide a misleading conclusion the campaign might fail to deny service, but an attacker submitting a DOS attack during daytime might easily cause denial of service.

As a third example, a CISO may want to test whether a specific method of attack is effective against his networked system. The IT team has installed a security tool that is expected to detect the attack and raise an alert at the screen of the administrator-on-duty. What the CISO specifically wants to test is whether the alert is noticed if it occurs at 1am, which is the time in which there is a change of responsibility from one administrator-on-duty to another administrator-on-duty. There is no interest in running a campaign based on a pre-defined scenario created for that purpose at any time other than 1am.

As a fourth example, an administrator may want to run a very extensive test which requires a lot of data traffic inside the tested networked system. Executing a campaign based on a suitable pre-defined scenario when the organization is at full operation and all network nodes are in heavy use might overrun the network capacity and cause noticeable delays and hick-ups in the response of the operational services of the organization. In such case it is desired that the pre-defined scenario created for the heavy testing task will not be usable during normal business hours, but only at other hours in which many of the employees are not present and their terminal nodes are asleep.

Prior art penetration testing scenarios do not support the use cases described in the above examples.

SUMMARY

The present invention relates to systems and methods for penetration testing of a networked system, and to user-selectable time-tagged scenarios for conducting time-specific penetration testing campaigns.

Embodiments of a method for penetration testing of a networked system are disclosed. The method for penetration testing of the networked system is carried out by executing a penetration testing campaign. The penetration testing campaign is executed by an automated penetration testing system that is controlled by a user interface of a computing device. The method comprises determining a time at which the penetration testing campaign is scheduled to start execution. The determining is done by the penetration testing system. The method also comprises retrieving a first set of pre-defined penetration testing scenarios from a storage device. The retrieving is done by the penetration testing system. Each of the pre-defined penetration testing scenarios in the first set is associated with a corresponding time tag. The method also comprises causing a first display device to display a second set of pre-defined penetration testing scenarios. The causing is done by the penetration testing system. The second set is a subset of the first set. The method also comprises receiving one or more manually-entered inputs. The receiving is done by the penetration testing system via the user interface of the computing device. The one or more manually-entered inputs select one pre-defined penetration testing scenario included in the first set. The selecting of the one pre-defined penetration testing scenario is limited to selecting only a pre-defined penetration testing scenario associated with a time tag which matches the time at which the penetration testing campaign is scheduled to start execution. The method also comprises setting the penetration testing campaign to be based on the selected one pre-defined penetration testing scenario. The method also comprises executing the penetration testing campaign so as to test the networked system. The executing is done by the penetration testing system. The method also comprises reporting at least one security vulnerability determined to exist in the networked system by the executing of the penetration testing campaign. The reporting is done by the penetration testing system. The reporting comprises at least one of causing a second display device to display information about the at least one security vulnerability, recording information about the at least one security vulnerability in a file, and electronically transmitting information about the at least one security vulnerability.

In some embodiments of the method, for each given pre-defined penetration testing scenario in the first set, the given pre-defined penetration testing scenario is included in the second set if and only if the given pre-defined penetration testing scenario is associated with a time tag which matches the time at which the penetration testing campaign is scheduled to start execution.

In some embodiments of the method, the second set is equal to the first set, and each pre-defined penetration testing scenario in the first set which is associated with a time tag that does not match the time at which the penetration testing campaign is scheduled to start execution is marked on the first display device as not being selectable.

In some embodiments, the method can further comprise receiving—by the penetration testing system and via the user interface of the computing device—credentials of a user that is authorized to override time tags, and, subsequent to the receiving of the credentials, receiving—from the user that is authorized to override time tags and via the user interface of the computing device—a command to consider the time tag associated with the selected one pre-defined penetration testing scenario as matching the time at which the penetration testing campaign is scheduled to start execution. The command to consider can be a command to consider the time tags associated with all the pre-defined penetration testing scenarios in the first set as matching the time at which the penetration testing campaign is scheduled to start execution. The command to consider can be a command to consider the time tag of a single pre-defined penetration testing scenario as matching the time at which the penetration testing campaign is scheduled to start execution.

In some embodiments, the first display device and the second display device can be the same display device. In some embodiments, the determined time at which the penetration testing campaign is scheduled to start execution is the current time. In some embodiments, the determining of the time at which the penetration testing campaign is scheduled to start execution includes: receiving via the user interface of the computing device one or more additional manually-entered inputs selecting the time at which the penetration testing campaign is scheduled to start execution.

In some embodiments, the setting of the penetration testing campaign to be based on the selected one pre-defined penetration testing scenario can include assigning every information item of the penetration testing campaign a value taken from the corresponding information item of the selected one pre-defined penetration testing scenario. In some embodiments, the setting of the penetration testing campaign to be based on the selected one pre-defined penetration testing scenario can include, for at least one information item of the penetration testing campaign, receiving a value for the one information item, wherein the receiving of the value is from a user of the penetration testing system and via the user interface of the computing device, and the receiving is subsequent to the selecting of the pre-defined penetration testing scenario.

In some embodiments, the time tag with which the selected one pre-defined penetration testing scenario is associated can have the form of a time interval, and the time tag can include one of a starting time and an ending time, a starting time and a time duration, and a time value and plus and minus tolerances. In some embodiments, the time tag with which the selected one pre-defined penetration testing scenario is associated can have the form of a time point. In some embodiments, the time tag with which the selected one pre-defined penetration testing scenario is associated can be a repeating time tag. The repeating time tag can repeat every day. The repeating time tag can repeat every week. The repeating time tag can repeat every month. The repeating time tag can repeat every year.

In some embodiments, the method can further comprise detecting a continuance of the executing of the penetration testing campaign until a Boolean condition represented by the time tag associated with the selected one pre-defined penetration testing scenario becomes not satisfied, and, in response to the detecting, automatically terminating the executing of the penetration testing campaign. In some embodiments, the method can further comprise detecting a continuance of the executing of the penetration testing campaign until a Boolean condition represented by the time tag associated with the selected one pre-defined penetration testing scenario becomes not satisfied, and, in response to the detecting, continuing the executing of the penetration testing campaign while the Boolean condition is not satisfied.

Embodiments of a penetration testing system for testing a networked system by executing a penetration testing campaign are disclosed. The system comprises a computing device including one or more computer processors and a non-transitory computer-readable storage medium storing program instructions for executing a penetration testing campaign, wherein the program instructions are for execution by the one or more computer processors and wherein the stored program instructions comprise: first program instructions for determining a time at which the penetration testing campaign is scheduled to start execution; second program instructions for retrieving a first set of pre-defined penetration testing scenarios from a storage device, wherein each of the pre-defined penetration testing scenarios in the first set is associated with a corresponding time tag; third program instructions for causing a first display device to display a second set of pre-defined penetration testing scenarios, the second set being a subset of the first set; fourth program instructions for receiving, via a user interface of the computing device, one or more manually-entered inputs, the one or more manually-entered inputs selecting one pre-defined penetration testing scenario included in the first set, wherein the selecting of the one pre-defined penetration testing scenario is limited to selecting only a pre-defined penetration testing scenario associated with a time tag which matches the time at which the penetration testing campaign is scheduled to start execution; fifth program instructions for setting the penetration testing campaign to be based on the selected one pre-defined penetration testing scenario; sixth program instructions for executing the penetration testing campaign so as to test the networked system; and seventh program instructions for reporting at least one security vulnerability determined to exist in the networked system by the executing of the penetration testing campaign, wherein the reporting comprises at least one of (i) causing a second display device to display information about the at least one security vulnerability, (ii) recording information about the at least one security vulnerability in a file, and (iii) electronically transmitting information about the at least one security vulnerability.

A method for executing a penetration testing campaign in a networked system is disclosed. The method uses an automated penetration testing system that includes a library of multiple pre-defined test scenarios with respective time tags, and the penetration testing campaign is scheduled to start at a specific start time. The method comprises displaying pre-defined test scenarios from the library whose respective time tags match the specific start time. The displaying is by a first display device. The displaying enables a selection of a pre-defined test scenario by a user of the automated penetration testing system, and pre-defined test scenarios from the library whose respective time tags do not match the specific start time are either not displayed by the first display device or are displayed by the first display device but are not selectable by the user. The method also comprises executing the penetration testing campaign, so as to test the networked system, the executing being in response to a selection by the user of a pre-defined test scenario using a user interface of the automated penetration testing system and based on the user-selected pre-defined test scenario. The method also comprises reporting at least one security vulnerability determined to exist in the networked system by the penetration testing campaign, the reporting comprising at least one of: (i) causing a second display device to display information about the at least one security vulnerability, (ii) recording information about the at least one security vulnerability in a file, and (iii) electronically transmitting information about the at least one security vulnerability.

In some embodiments, the method can further comprise receiving credentials of a user that is authorized to override time tags. The receiving can be done by the penetration testing system via the user interface of the computing device. The method can further comprise receiving a command to consider the respective time tag of the selected pre-defined penetration testing scenario as matching the time at which the penetration testing campaign is scheduled to start execution. The receiving of the command to consider should be from the user that is authorized to override time tags and via the user interface of the computing device, subsequent to the receiving of the credentials. In some embodiments, the command to consider can be a command to consider the respective time tags of all the pre-defined penetration testing scenarios in the library as matching the specific start time at which the penetration testing campaign is scheduled to start execution. In some embodiments, the command to consider can be a command to consider the respective time tag of a single pre-defined penetration testing scenario as matching the specific start time at which the penetration testing campaign is scheduled to start execution.

In some embodiments, the user interface of the automated penetration testing system can comprise the first display device. In some embodiments, the specific start time at which the penetration testing campaign is scheduled to start execution can be the current time. In some embodiments, the specific start time at which the penetration testing campaign is scheduled to start execution can be received, by the automated penetration system, via the user interface of the automated penetration testing system.

In some embodiments, executing the penetration testing campaign based on the user-selected pre-defined test scenario can include assigning every information item of the penetration testing campaign a value taken from the corresponding information item of the selected pre-defined test scenario. In some embodiments, the executing of the penetration testing campaign based on the user-selected pre-defined test scenario can include, for at least one information item of the penetration testing campaign, receiving a value for the one information item, wherein the receiving of the value is from the user of the automated penetration testing system and via the user interface of the automated penetration testing system, and the receiving is subsequent to the selecting of the pre-defined test scenario.

In some embodiments, the respective time tag of the selected pre-defined test scenario has the form of a time interval, and the time tag can include one of a starting time and an ending time, a starting time and a time duration, and a time value and plus and minus tolerances. In some embodiments, the time tag with which the selected pre-defined penetration testing scenario is associated can have the form of a time point. In some embodiments, the time tag with which the selected pre-defined penetration testing scenario is associated can be a repeating time tag. The repeating time tag can repeat every day. The repeating time tag can repeat every week. The repeating time tag can repeat every month. The repeating time tag can repeat every year.

In some embodiments, the method can further comprise detecting a continuance of the executing of the penetration testing campaign until a Boolean condition represented by the user-selected pre-defined test scenario's respective time tag becomes not satisfied, and, in response to the detecting, automatically terminating the executing of the penetration testing campaign. In some embodiments, the method can further comprise detecting a continuance of the executing of the penetration testing campaign until a Boolean condition represented by the user-selected pre-defined test scenario's respective time tag becomes not satisfied, and, in response to the detecting, continuing the executing of the penetration testing campaign while the Boolean condition is not satisfied.

A system for executing a penetration testing campaign of a networked system is disclosed, wherein the penetration testing campaign is scheduled to start at a specific start time. The system comprises a first non-transitory computer-readable storage medium comprising a library of test scenarios, each test scenario associated with a respective time tag. The system also comprises a computing device comprising one or more computer processors; the computing device also comprises a user interface module comprising a display device for displaying multiple test scenarios from the library and enabling user selection of one of the multiple test scenarios, such that test scenarios from the library whose respective time tags match the scheduled specific start time are displayed and are selectable by the user, and test scenarios from the library whose respective time tags do not match the scheduled specific start time are either not displayed or are displayed but are not selectable by the user. The system also comprises a second non-transitory computer-readable storage medium comprising program instructions that, when executed by the one or more computer processors of the computing device, cause the one or more computer processors to execute the penetration testing campaign on the basis of the user-selected test scenario so as to test the networked system, and report at least one security vulnerability determined by the testing of the networked system.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. In the drawings:

FIGS. 1F, 1G, 1H and 1J illustrate the displaying of pre-defined test scenarios on a display device, according to various embodiments.

DETAILED DESCRIPTION OF THE EMBODIMENTS

Figure 1A:
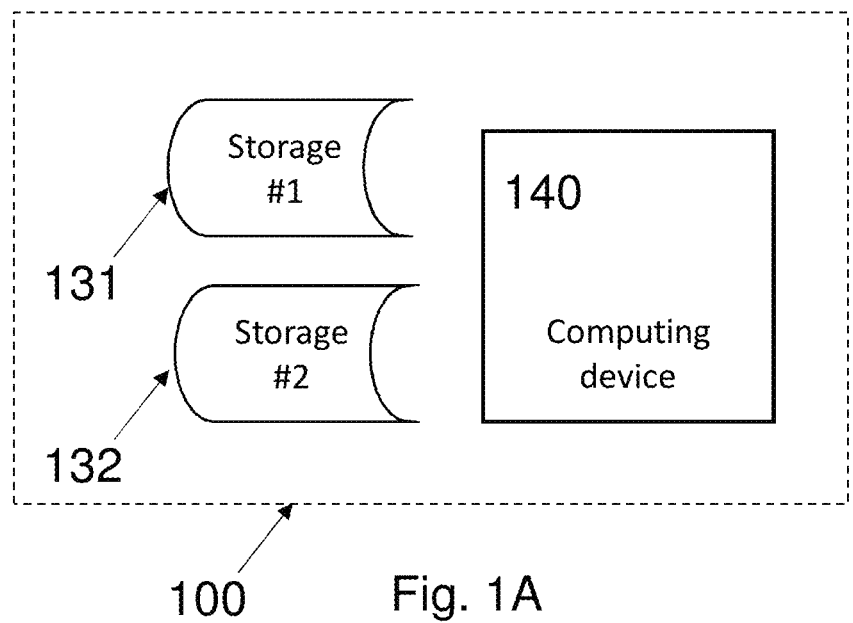
FIG. 1A is a functional block diagram of a penetration testing system according to some embodiments.
Figure 1B:
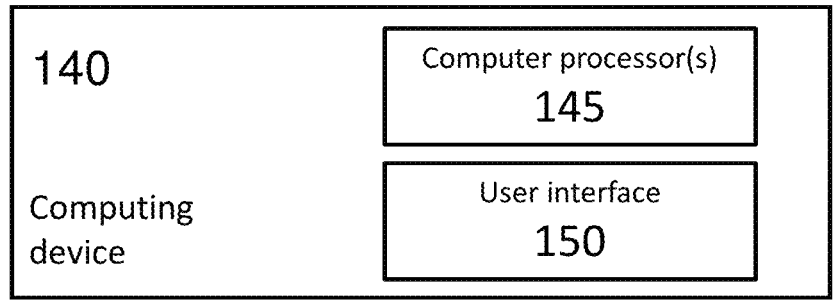
FIG. 1B is a functional block diagram of the computing device shown in FIG. 1A, according to some embodiments.
Figure 1C:
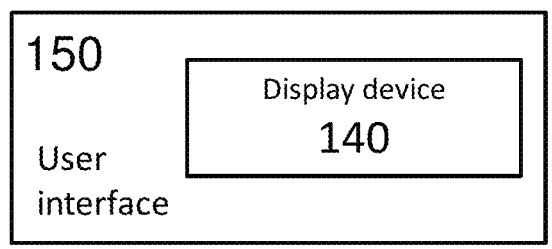
FIG. 1C is a functional block diagram of the user interface shown in FIG. 1B, according to embodiments.
Figure 1D:
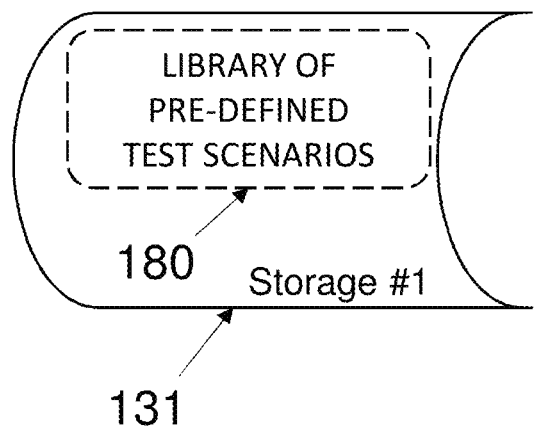
FIG. 1D shows a schematic representation of a computer-readable storage medium of FIG. 1A comprising a library of penetration testing scenarios, according to some embodiments.

Due to the tedious effort required for selecting values for all the information items of a penetration testing campaign executed for testing a networked system, penetration testing campaigns are typically based on pre-defined test scenarios. A pre-defined test scenario can be created by a provider of penetration testing systems, or by a third-party provider of pre-defined test scenarios for use with another provider's penetration testing systems, or by a user, or owner of an end-user license, of a penetration testing system.

As described earlier, a pre-defined test scenario includes values for items of information guiding the testing that is to take place during a penetration testing campaign that is based on that pre-defined test scenario.

According to embodiments, a 'time tag' is associated with each pre-defined scenario. A time tag can be, for example, a field in a database or library of records containing multiple pre-defined test scenarios. The database or library can be stored in a non-transient computer-readable storage medium. The time tag indicates the time in which a campaign based on the pre-defined scenario can be started.

A time tag represents a time-related Boolean condition (i.e., the time information of a time tag implicitly encodes a Boolean condition), which can be applied to any given time to determine whether the Boolean condition is met for that given time, and consequently whether that given time is matched by the time tag. For example, during the course of selecting test scenarios with time tags matching a scheduled start time of a penetration testing campaign, the Boolean condition represented by the time tag of a specific pre-defined scenario can be applied to the scheduled start time. In one illustrative example, if the time tag represents a Boolean condition for 'is between 7 am and 9 am on Friday mornings', then if the scheduled start time of a penetration testing campaign is at 8 am on any given Friday morning, then the time tag is said to 'match' the scheduled start time of the penetration testing campaign because its Boolean condition is met when applied to that scheduled start time of the penetration testing campaign. The example given of 'is between 7 am and 9 am on Friday mornings' means that the time tag in question is a 'repeating' time tag (it repeats every week) and it has the form of a time interval expressed by a combination of a starting time and an ending time. The expression 'match' as used herein in the context of a time tag matching, for example, a scheduled starting time of a penetration testing scenario, means that the Boolean condition represented by the time tag is satisfied when applied to (as per the example) the scheduled starting time.

A time tag may have a different form than that of the example above. For example, instead of the time interval being expressed in terms of a combination of a starting time and an ending time, the time interval can be expressed in terms of a combination of a starting time and a time duration, or in terms of a combination of a time value and plus and minus tolerances. As discussed with respect to the example, the Boolean condition of a time tag defined by a time interval is satisfied (is true) if and only if the given time is within the time interval. The above example applied the Boolean condition to the scheduled starting time of a penetration testing campaign, but the Boolean condition may be applied to any other given time.

A time tag may also be expressed by a single time value rather than by a time interval. The Boolean condition of such a time tag is satisfied (is true) if and only if the given time is within a pre-defined tolerance of the time point. The tolerance can be zero, or greater than zero.

In other examples, time tags can have 'negative' Boolean conditions. An example of such a time tag is one provided in the form of a time interval, which is expressed by a combination of a starting time and an ending time, by a combination of a starting time and a time duration or by a combination of a time value and plus and minus tolerances. In the example, the Boolean condition is satisfied (is true) if and only if the given time is outside the time interval—just the opposite of a 'regular,' or positive Boolean condition. In another example, a time tag can be expressed by a single time value, and represents a Boolean condition that is satisfied (is true) if and only if the given time is not within a pre-defined tolerance of the time point—again the opposite of the 'regular' time-point time tag.

Another example of a time tag is one with a Boolean condition that is always satisfied (always true). Such an example might be found in the case of a pre-defined test scenario that is allowed to be run anytime of the day, week, month or year.

As mentioned above, a time tag may in some embodiments also include repeatability information. The repeatability information may indicate one of: (i) there is no repeating, (ii) repeating every day, (iii) repeating every week, (iv) repeating every month, and (v) repeating every year. A time tag that includes repeatability information other than "there is no repeating" is said to be "a repeating time tag." The meaning of the time information provided by a time interval or a time point of such a time tag depends on the repeatability information of that time tag.

The time tag is set by the creator of the pre-defined scenario, be it the provider of the penetration testing system or a user of the penetration testing system using a scenario editor.

When a scenario editor is available to the user, he may be able to override and change the time tag of an existing pre-defined scenario, even when created by the provider of the penetration testing system.

A possible value for the time tag of a pre-defined scenario is a special reserved value that indicates that the pre-defined scenario is enabled to be used at any time.

The time tag may be a single time point close to which a campaign based on the pre-defined scenario can be launched. This kind of time tag may be useful if applied within the framework of the third example in the "Drawbacks of prior-art systems" section above.

Alternatively, the time tag may be a time interval within which a campaign based on the pre-defined scenario can be launched, specified either by a starting time and an ending time, by a starting time together with a time span, or by a time value together with plus and minus tolerances. This kind of time tag may be useful if applied within the frameworks of the first, second and fourth examples in the "Drawbacks of prior-art systems" section above.

While the above forms of the time tag enable the execution of a campaign based on a pre-defined scenario when close to the given time point or when within the given time interval, other forms of the time tag enable execution of a campaign based on the pre-defined scenario when not close to the given time point or when not within the given time interval.

The time tag may indicate a time interval or time point that repeats every day. For example, the pre-defined scenario is meant to be used between 1 am and 3 am in any day of the week.

Alternatively, the time tag may indicate a time interval or a time point that repeats every week. For example, the pre-defined scenario is meant to be used between Monday 9 am and Friday 5 pm in any week of the year.

Alternatively, the time tag may indicate a time interval or a time point that repeats every month. For example, the pre-defined scenario is meant to be used from 9 am on the $1^{st}$ day of the month to 9 am on the $2^{nd}$ day of the month, for each month (for example, the time span of processing the employees' salaries).

Alternatively, the time tag may indicate a time interval or a time point that repeats every year. For example, the pre-defined scenario is meant to be used from 9 am on January 1 st to 9 am on January 5th of each year (for example, the time span of closing a company's books).

Alternatively, the time tag may indicate a one-time time interval or time point that does not repeat. For example, the pre-defined scenario is meant to be used between 9 am on Jan. 1, 2017, and 9 am on Feb. 1, 2017, and not before or after that time interval.

In alternative embodiments, a time tag associated with a pre-defined scenario can indicate the time in which a campaign based on the pre-defined scenario must be terminated. Such a termination-indicating time tag can have any of the forms and attributes of 'standard' start-indicating time tags discussed above, including, for example, the form of a time interval or the form of a time point. In other alternative embodiments, a time tag can indicate the time in which a campaign based on the pre-defined scenario can be started, as well as the time in which a campaign based on the pre-defined scenario must be terminated. Such a 'dual-time' time tag can have many of the forms and attributes of 'standard' start-indicating time tags discussed above, including, for example, the form of a time interval, which can be useful for controlling both starting and termination of a penetration testing campaign. In still other alternative embodiments, a pre-defined penetration testing scenario can be associated with two separate time tags—where one time tag represents a Boolean condition to be applied to a penetration testing campaign scheduled start time, and a second time tag represents a Boolean condition to be applied to terminate the penetration testing campaign.

In embodiments, the setting-up of the time tag for a pre-defined scenario is done using a human-interface (preferably a graphic user-interface) that is integrated with and forms part of the human interface used for defining the other information items of the pre-defined scenario. A non-exhaustive list of examples of possible information items in a penetration testing campaign is presented in the 'Definitions' section under definition no. 20.

In one embodiment, when a user prepares for a penetration test by defining a campaign for immediate execution, he typically accesses the list of pre-defined scenarios available in the library of scenarios. The list of pre-defined scenarios presented to him includes only those scenarios that are available for use at the current point of time according to their time tags. Scenarios whose time tags indicate they are not available for execution at the current time are not shown.

When a user prepares a penetration test by defining a campaign for execution at a future time, the user specifies the desired time of execution and then the list of pre-defined scenarios presented to him includes only pre-defined scenarios available to be executed at that future time according to their time tags. When the user changes the desired execution time, the list of available pre-defined scenarios is automatically adjusted accordingly.

In another embodiment, when a user prepares for a penetration test by defining a campaign (either for immediate execution or for future execution), the list of pre-defined scenarios presented to him includes all the pre-defined scenarios in the library of scenarios, regardless of their time tags. However, each pre-defined scenario whose time tag causes the pre-defined scenario to be unavailable for the campaign is made non-selectable. For example, such non-selectable scenarios are greyed-out on the screen, letting the user know he cannot select them. In other examples, which are non-limiting and not exhaustive, non-selectable scenarios can be indicated as being non-selectable by having other distinguishing features such as a different font or a different background color, or by sounding an audible alarm or displaying a message (such as, for example, an error message) when a user tries to select one of the 'non-selectable' scenarios.

The user has an option to override the time tag restriction associated with a pre-defined test scenario and use a pre-defined scenario in a time it was not meant for. This may require entering a password, so as to allow this only to the CISO or the chief administrator, but not to other users of the penetration testing system. The overriding may apply to all the pre-defined scenarios in the library, or it may apply only to a single pre-defined scenario the user wishes to use for the campaign he is preparing for.

As explained above, use of time tags associated with pre-defined scenarios makes sure a campaign based on a pre-defined scenario that is associated with a time tag having the form of a time interval does not start execution outside the time interval. This, however, does not make sure the campaign does not extend beyond the end of the time interval, if its execution is long enough. The user can be provided with a selection between automatically terminating the campaign when it extends beyond the end of the time interval and between letting the campaign run to its completion regardless of the time tag. Such a selection can be made by the user when defining a campaign based on a pre-defined scenario, or can be associated with the pre-defined scenario before the pre-defined scenario is selected for use, including at the time that the time tag associated with the pre-defined scenario is added to the library of pre-defined scenarios.

A method, useful for penetration testing of a networked system by executing a penetration testing campaign by a penetration testing system that is controlled by a user interface of a computing device, comprises: determining, by the penetration testing system, a time at which the penetration testing campaign is scheduled to start execution; retrieving, by the penetration testing system, a first set of pre-defined penetration testing scenarios from a storage device, wherein each of the pre-defined penetration testing scenarios in the first set is associated with a corresponding time tag; causing, by the penetration testing system, a first display device to display a second set of pre-defined penetration testing scenarios, the second set being either equal to the first set or a subset of the first set; receiving, by the penetration testing system and via the user interface of the computing device, one or more manually-entered inputs, the one or more manually-entered inputs selecting a pre-defined penetration testing scenario included in the first set, wherein the selecting of the pre-defined penetration testing scenario is limited to selecting only a pre-defined penetration testing scenario associated with a time tag which matches the time at which the penetration testing campaign is scheduled to start execution; setting the penetration testing campaign to be based on the selected pre-defined penetration testing scenario; executing the penetration testing campaign by the penetration testing system so as to test the networked system; and reporting, by the penetration testing system, at least one security vulnerability determined to exist in the networked system by the executing of the penetration testing campaign, wherein the reporting comprises at least one of (i) causing a second display device to display a report describing the at least one security vulnerability, and (ii) electronically transmitting a report describing the at least one security vulnerability.

The method may be such that for each given pre-defined penetration testing scenario in the first set, the given pre-defined penetration testing scenario is included in the second set if and only if the given pre-defined penetration testing scenario is associated with a time tag which matches the time at which the penetration testing campaign is scheduled to start execution. In other words, only pre-defined scenarios which are associated with a time tag which matches the time at which the penetration testing campaign is scheduled to start execution, are presented to the user. Pre-defined scenarios which do not satisfy this condition are not displayed at all. Thus, the user can be assured that he may pick any of the presented pre-defined scenarios, as all of them are available for use for the currently-planned campaign.

The method may be such that (i) the second set is equal to the first set, and (ii) each pre-defined penetration testing scenario in the first set which is associated with a time tag that does not match the time at which the penetration testing campaign is scheduled to start execution is marked on the first display device as not being selectable. In other words, all the pre-defined scenarios in the library are presented to the user, regardless of their time tags. However, those pre-defined scenarios which are associated with a time tag that does not match the time at which the penetration testing campaign is scheduled to start execution, are not selectable. Thus, the user has to look out for some visual indication differentiating non-selectable pre-defined scenarios from selectable ones.

The method may further comprise: receiving, by the penetration testing system and via the user interface of the computing device, credentials of a user that is authorized to override time tags; and subsequent to the receiving of the credentials, receiving via the user interface of the computing device a command to consider the time tag associated with the selected pre-defined penetration testing scenario as matching the time at which the penetration testing campaign is scheduled to start execution. The command to consider may be a command to consider the time tags associated with all the pre-defined penetration testing scenarios in the first set as matching the time at which the penetration testing campaign is scheduled to start execution. Alternatively, the command to consider may be a command to consider the time tag of a single pre-defined penetration testing scenario as matching the time at which the penetration testing campaign is scheduled to start execution.

The first display device and the second display device may be a same display device. The time at which the penetration testing campaign is scheduled to start execution may be determined to be the current time. Alternatively, the time at which the penetration testing campaign is scheduled to start execution may be determined by receiving via the user interface of the computing device additional one or more manually-entered inputs selecting the time at which the penetration testing campaign is scheduled to start execution.

The method may be such that every information item of the penetration testing campaign is assigned a value from the corresponding information item of the selected pre-defined penetration testing scenario. In other words, the campaign is fully based on the selected pre-defined scenario, with no information item being overridden by the user.

Alternatively, the method may be such that for at least one information item of the penetration testing campaign, a value is received from a user of the penetration testing system via the user interface of the computing device subsequent to the selecting of the pre-defined penetration testing scenario. In other words, after selecting the pre-defined scenario on which the campaign will be based, the user changes at least one of the values of information items assigned to the campaign from the selected pre-defined scenario.

The time tag with which the selected pre-defined penetration testing scenario is associated may have the form of a time interval. The time tag may include a starting time and an ending time. The time tag may include a starting time and a time duration. The time tag with which the selected pre-defined penetration testing scenario is associated may have the form of a time point. The time tag with which the selected pre-defined penetration testing scenario is associated may be a repeating time tag. The repeating time tag may repeat every day. The repeating time tag may repeat every week. The repeating time tag may repeat every month. The repeating time tag may repeat every year.

The method may further comprise: if the executing of the penetration testing campaign continues until the Boolean condition becomes not satisfied, automatically terminating the executing of the penetration testing campaign. Alternatively, the method may further comprise: if the executing of the penetration testing campaign continues until the Boolean condition becomes not satisfied, continuing the executing of the penetration testing campaign while the Boolean condition is not satisfied.

Reference is now made to the figures, and in particular to FIGS. 1A, 1B, 1C, 1D and 1E. A penetration testing system 100 comprises a computing device 140, first non-transitory computer-readable storage medium 131 and second non-transitory computer-readable storage medium 132. The enabling technologies for non-transitory computer-readable storage media are well known and include, but not exhaustively, magnetic media, optical media and solid-state media. The first non-transitory computer-readable storage medium 131 includes a library 180 of pre-defined test scenarios; the concept, design and utility of pre-defined test scenarios has been explained elsewhere in this disclosure. Computing device 140 includes one or more computer processors (collectively 145) and a user interface 150. User interface 150 includes a display device 140. Examples of suitable display devices include, for example, display screens of any size, form factor or material, or, alternatively, projectors. In some embodiments a user interface 150 can comprise a display device 140 with touchscreen capabilities for user inputs, and in other embodiments a user interface 150 can comprise a display device 140 along with one or more user input devices such as, for example, a keyboard and/or a mouse (both not shown) by means of which user inputs are made.

According to embodiments, penetration testing system 100 is suitable for executing a penetration testing campaign of a networked system, wherein the penetration testing campaign is scheduled to start at a specific start time. Display device 140 is operative to display multiple pre-defined test scenarios from the library 180 and to enable user selection of one of the multiple pre-defined test scenarios, such that pre-defined test scenarios from the library 180 whose respective time tags match the scheduled specific start time are displayed and are selectable by the user, and pre-defined test scenarios from the library whose respective time tags do not match the scheduled specific start time of the penetration testing campaign are either not displayed, or are displayed but are not selectable by the user.

'Displaying a scenario' means displaying a scenario to a user, for example as one pre-defined scenario within a plurality of pre-defined scenarios made available for user selection. The plurality can be shown as a list of scenarios, for example, a scrollable list, or it can be shown as a grid or matrix of scenarios, or in any other way deemed appropriate by the system designer for making the plurality visually accessible to a user. (All references to scenarios in the discussion of the figures are to predefined test/testing scenarios, and therefore the use of terms such as 'pre-defined scenario', 'pre-defined test scenario', and 'scenario' are all interchangeable.) The displaying can include showing a textual representation of a title or content item or other characterization of the scenario, or of an identifier, and can include showing a graphical representation of the scenario, all in accordance with the human-machine interface design of the penetration testing system 100. Examples of pre-defined scenarios being made 'not selectable' include greying-out such non-selectable scenarios on the display device thereby letting the user know he cannot select them. For example, the display device 140 shown for illustration purposes in FIG. 1F, wherein pre-defined test scenarios 1 through 3 are 'available' and selectable, while nos. 4 and 5 are not selectable and shown in gray. In contrast, the display device 140 in FIG. 1G can be seen to offer the same three 'available' pre-defined test scenarios as in FIG. 1F, but without displaying the non-selectable scenarios. In other non-limiting examples, non-selectable scenarios can be indicated as being non-selectable by having other distinguishing font features such as size or font face or color, or distinguishing background colors, or by sounding an audible alarm or displaying a message (such as, for example, a warning message or an error message) when a user tries to select one of the 'non-selectable' scenarios. FIG. 1H shows, for purposes of illustration, an example of a display device 140 wherein the selectable scenarios (1, 2 and 3) are in a larger, bolder font than the non-selectable scenarios (4 and 5). FIG. 1J shows, for illustration purposes, an example of a display device 140 wherein all pre-defined test scenarios are displayed to the user, but if a user selects a scenario that is not available for selection, an error/warning message is displayed; in this case, the user has selected scenario no. 5 and the error/warning message "Scenario unavailable. Please make another selection." is displayed.

Figure 1E:
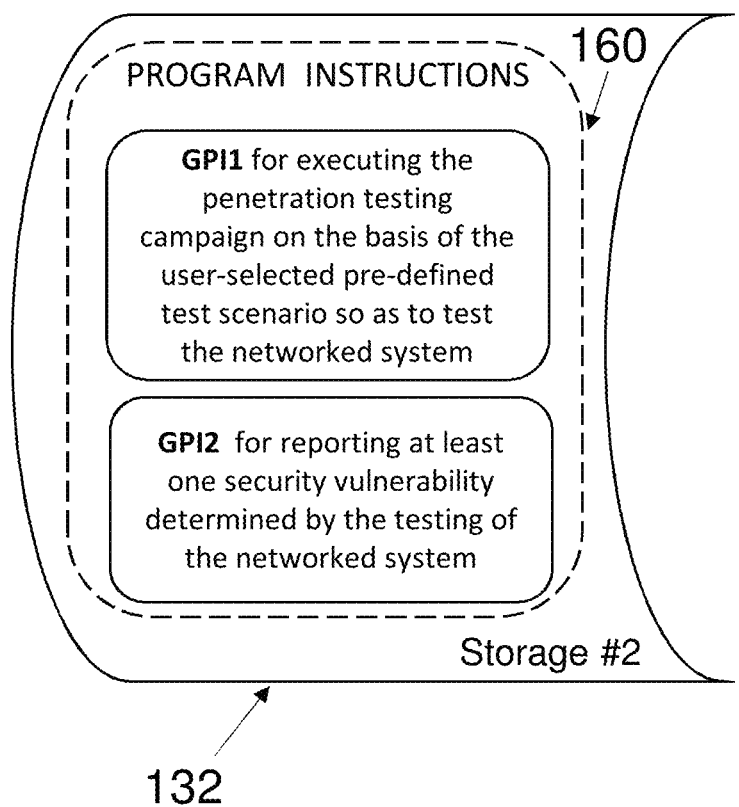
FIG. 1E shows a schematic representation of a computer-readable storage medium of FIG. 1A comprising program instructions stored thereon, according to some embodiments.

As illustrated in FIG. 1E, the second non-transitory computer-readable storage medium 132 comprises program instructions 160. According to embodiments, the programs instructions 160 include two groups of program instructions: program instructions GPI1 for executing the penetration testing campaign on the basis of the user-selected pre-defined test scenario so as to test the networked system, and program instructions GPI2 for reporting at least one security vulnerability determined by the testing of the networked system. The program instructions 160, when executed by one or more computer processors 145, cause the one or more computer processors 145 to execute the penetration testing campaign on the basis of the user-selected pre-defined test scenario so as to test the networked system, and report at least one security vulnerability determined by the testing of the networked system.

Figure 2A:
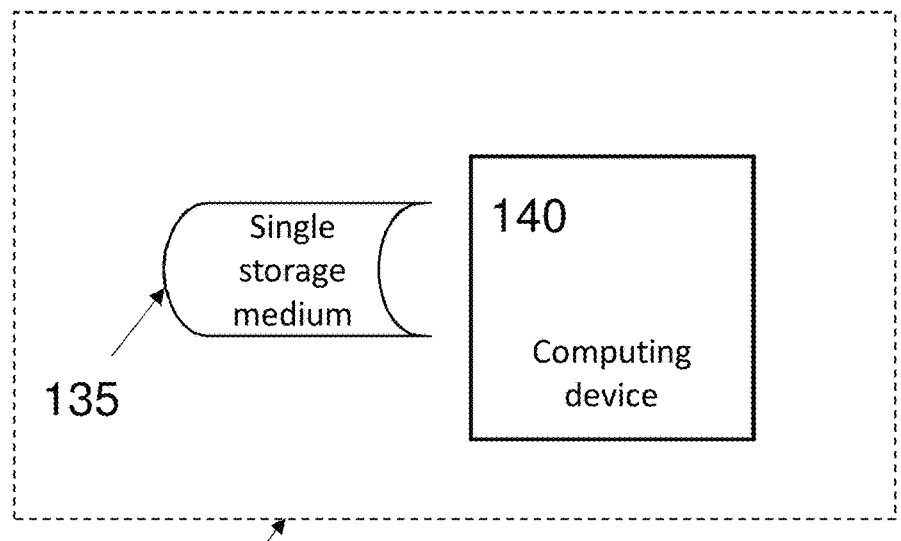
FIG. 2A is a functional block diagram of a penetration testing system according to some embodiments.
Figure 2B:
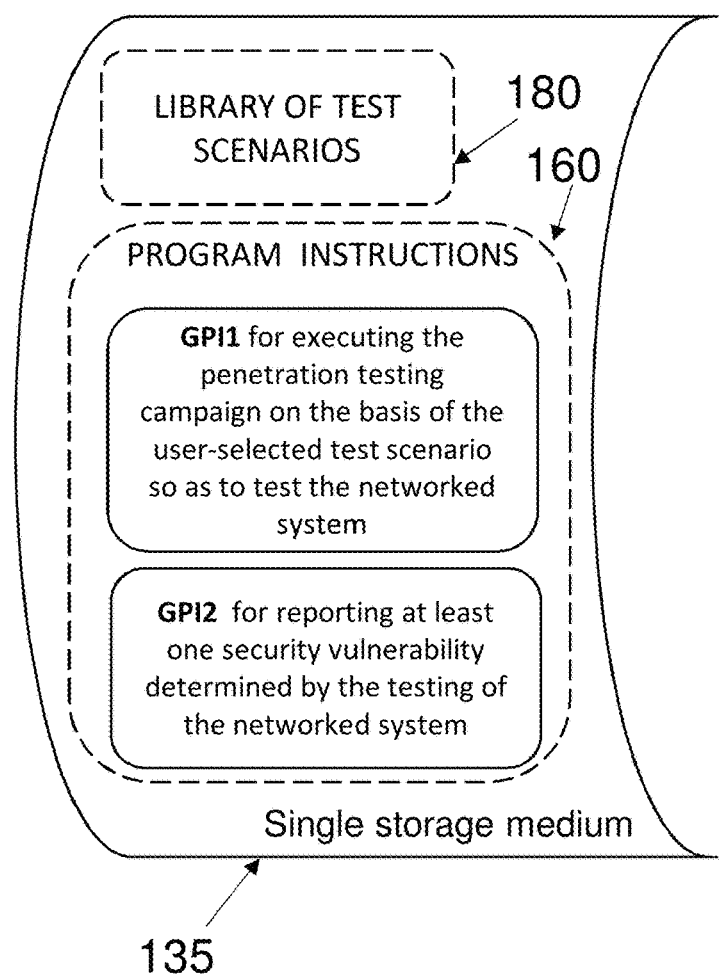
FIG. 2B shows a schematic representation of a computer-readable storage medium of FIG. 2A comprising a library of pre-defined penetration testing scenarios and program instructions stored thereon, according to some embodiments.

In some embodiments, first and second non-transitory computer-readable storage media 131, 132 can be the same non-transitory computer-readable storage medium. As illustrated in FIGS. 2A and 2B, the penetration system 100 includes computing device 140, which can be the same computing device 140 as in FIGS. 1A and 1B, and additionally includes a single non-transitory computer-readable storage medium 135 instead of the first and second non-transitory computer-readable storage media 131, 132 of FIGS. 1A-1E. As illustrated in FIG. 2B, the single non-transitory computer-readable storage medium 135 comprises the library 180 of pre-defined test scenarios and additionally comprises program instructions 160, which can be, for example, the same program instructions 160 described above in connection with FIG. 1E.

Figure 3A:
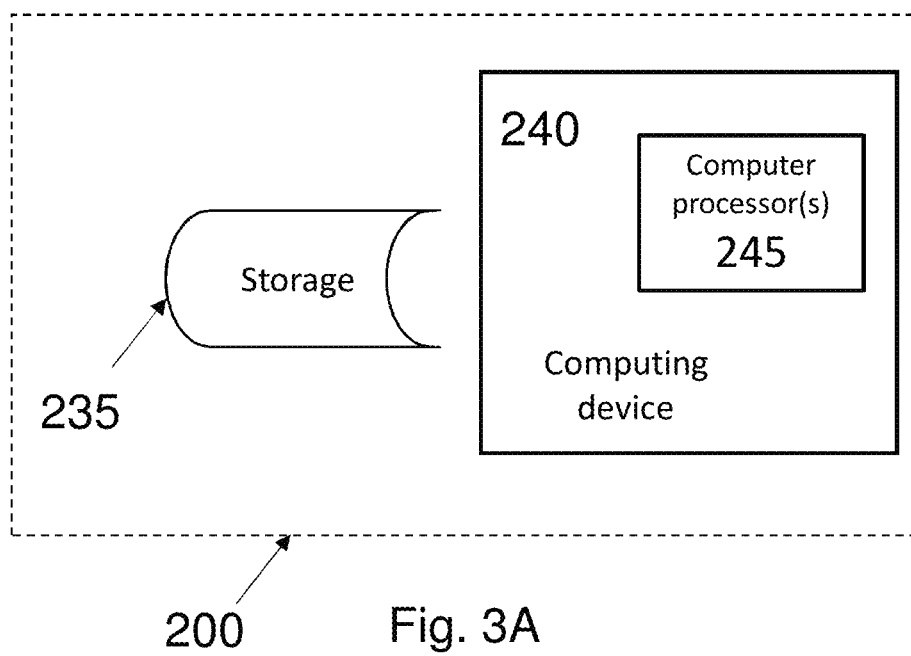
FIG. 3A is a functional block diagram of a penetration testing system according to some embodiments.
Figure 3B:
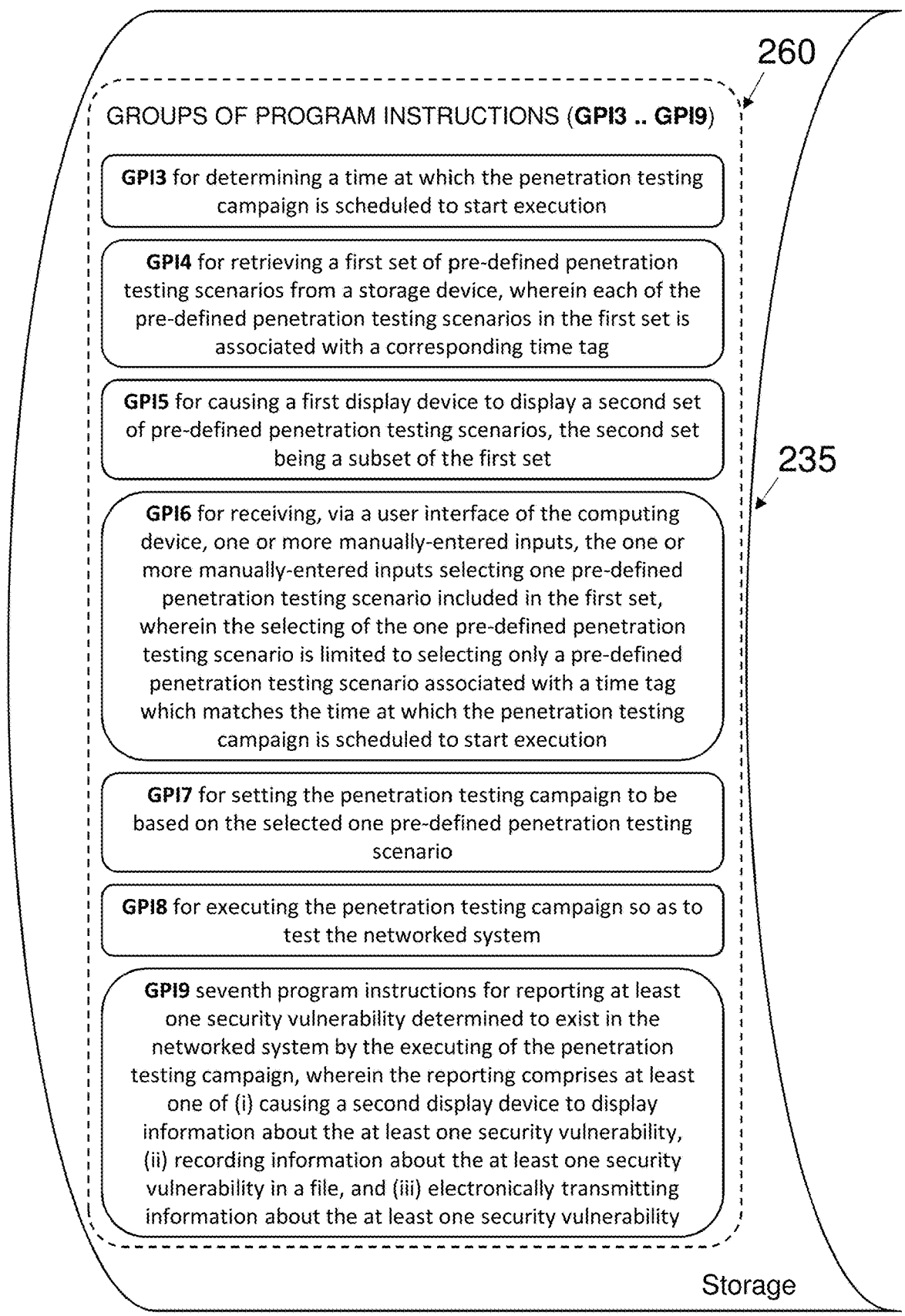
FIG. 3B, 4, 5 and 6 show schematic representations of a computer-readable storage medium of FIG. 3A and groups of program instructions stored thereon, according to various embodiments.

Referring now to FIGS. 3A and 3B, a penetration testing system 200 is disclosed. According to embodiments, penetration testing system 200 comprises computing device 240 and a non-transitory computer-readable storage medium 235, and is suitable for testing a networked system by executing a penetration testing campaign. Computing device 240 comprises one or more computer processors (collectively, 245). In some embodiments, computing device 240 can also comprise a user interface (not shown). The non-transitory computer-readable storage medium 235 comprises program instructions 260, wherein execution of the program instructions 260 by one or more computer processors 245 causes the one or more computer processors 245 to carry out portions of a method for executing a penetration testing campaign. The program instructions 260 comprise seven groups of program instructions GPI3 . . . GPI9, where each group of program instructions GPI3 . . . GPI9 includes the program instructions for the carrying out of one portion of the method. The seven groups of program instructions comprise:

a. Group of program instructions GPI3 including program instructions for determining a time at which the penetration testing campaign is scheduled to start execution.

b. Group of program instructions GPI4 including program instructions for retrieving a first set of pre-defined penetration testing scenarios from a storage device, wherein each of the pre-defined penetration testing scenarios in the first set is associated with a corresponding time tag.

c. Group of program instructions GPI5 including program instructions for causing a first display device to display a second set of pre-defined penetration testing scenarios, the second set being a subset of the first set.

d. Group of program instructions GPI6 including program instructions for receiving, via a user interface of the computing device, one or more manually-entered inputs, the one or more manually-entered inputs selecting one pre-defined penetration testing scenario included in the first set, wherein the selecting of the one pre-defined penetration testing scenario is limited to selecting only a pre-defined penetration testing scenario associated with a time tag which matches the time at which the penetration testing campaign is scheduled to start execution.

e. Group of program instructions GPI7 including program instructions for setting the penetration testing campaign to be based on the selected one pre-defined penetration testing scenario.

f. Group of program instructions GPI8 including program instructions for executing the penetration testing campaign by the penetration testing system so as to test the networked system.

g. Group of program instructions GPI9 including program instructions for reporting, by the penetration testing system, at least one security vulnerability determined to exist in the networked system by the executing of the penetration testing campaign, wherein the reporting comprises at least one of (i) causing a second display device to display information about the at least one security vulnerability, (ii) recording information about the at least one security vulnerability in a file, and (iii) electronically transmitting information about the at least one security vulnerability.

Figure 4:
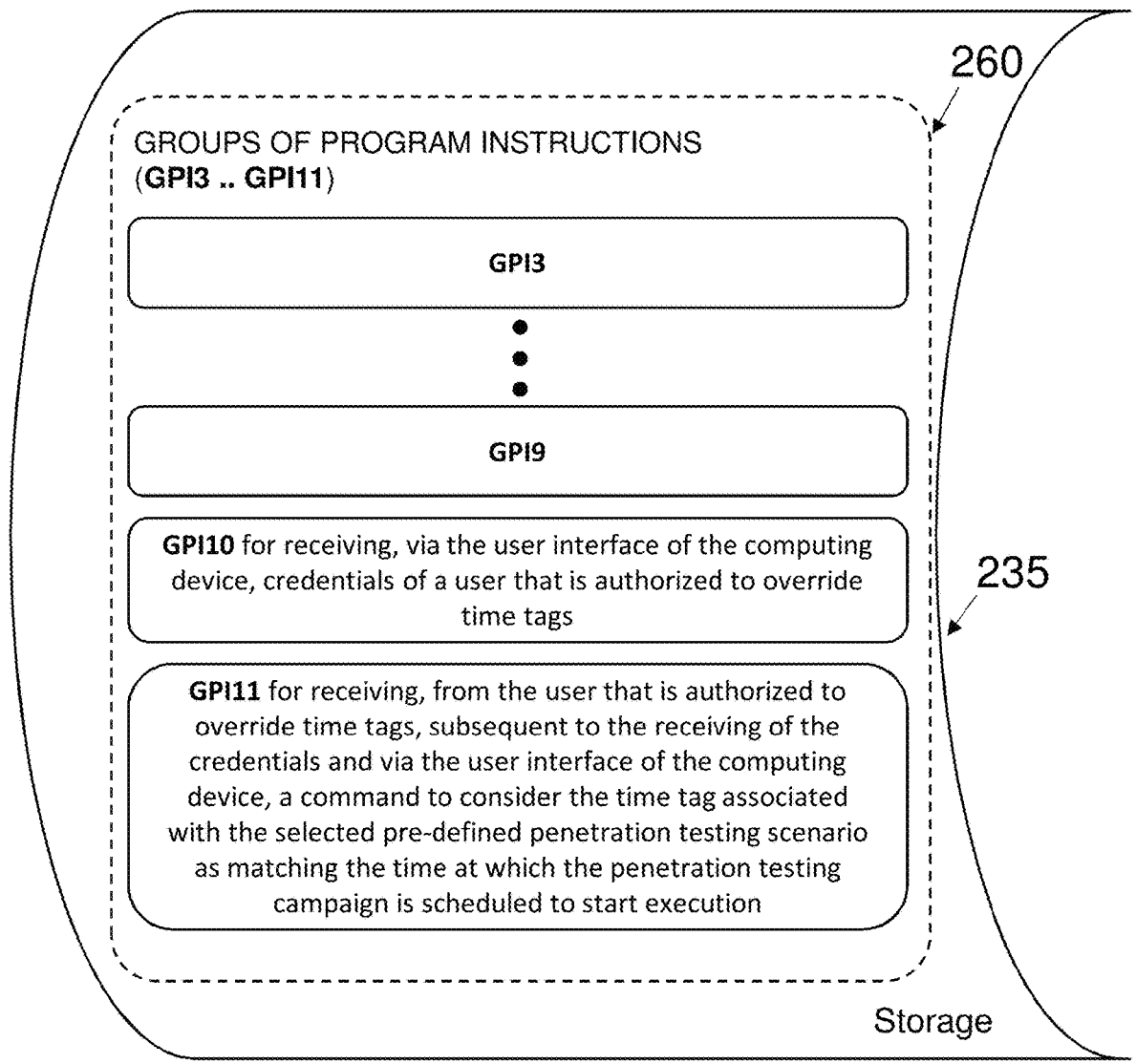

In some embodiments, for example as illustrated in FIG. 4, program instructions 260 comprise groups of program instructions GPI3 . . . GPI9 as above, and additionally comprise groups of program instructions GPI10 and GPI11 for carrying out additional portions of a method for executing a penetration testing campaign by the penetration testing system 200, the additional groups comprising:

a. Group of program instructions GPI10 including program instructions for receiving, via the user interface of the computing device, credentials of a user that is authorized to override time tags.

b. Group of program instructions GPI11 including program instructions for receiving, from the user that is authorized to override time tags, subsequent to the receiving of the credentials and via the user interface of the computing device, a command to consider the time tag associated with the selected pre-defined penetration testing scenario as matching the time at which the penetration testing campaign is scheduled to start execution.

Figure 5:
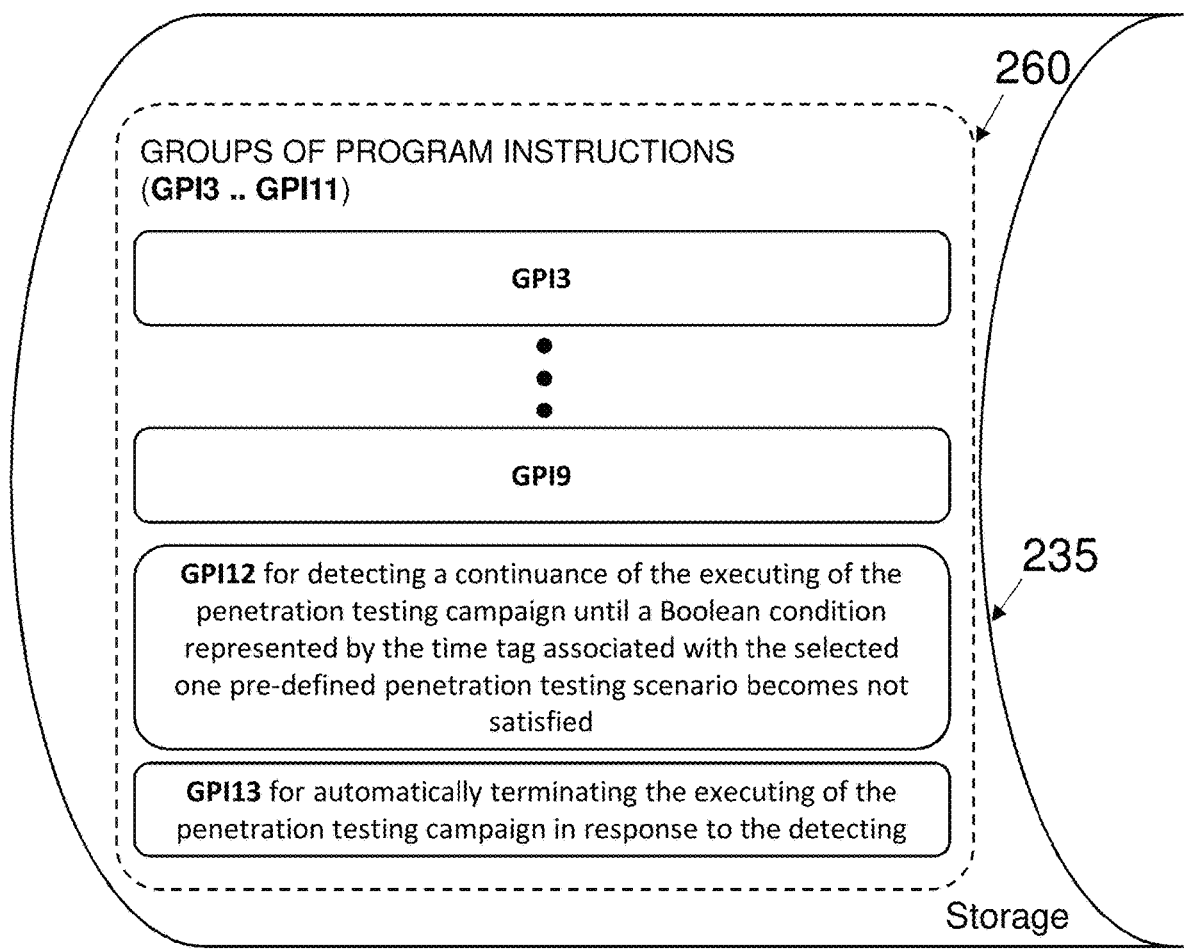

In some embodiments, for example as illustrated in FIG. 5, program instructions 260 comprise groups of program instructions GPI3 . . . GPI9 as above, and additionally comprise groups of program instructions GPI12 and GPI13 for carrying out additional portions of a method for executing a penetration testing campaign by the penetration testing system 200, the additional groups comprising:

a. Group of program instructions GPI12 including program instructions for detecting a continuance of the executing of the penetration testing campaign until a Boolean condition represented by the time tag associated with the selected one pre-defined penetration testing scenario becomes not satisfied.

b. Group of program instructions GPI13 including program instructions for automatically terminating the executing of the penetration testing campaign in response to the detecting.

Figure 6:
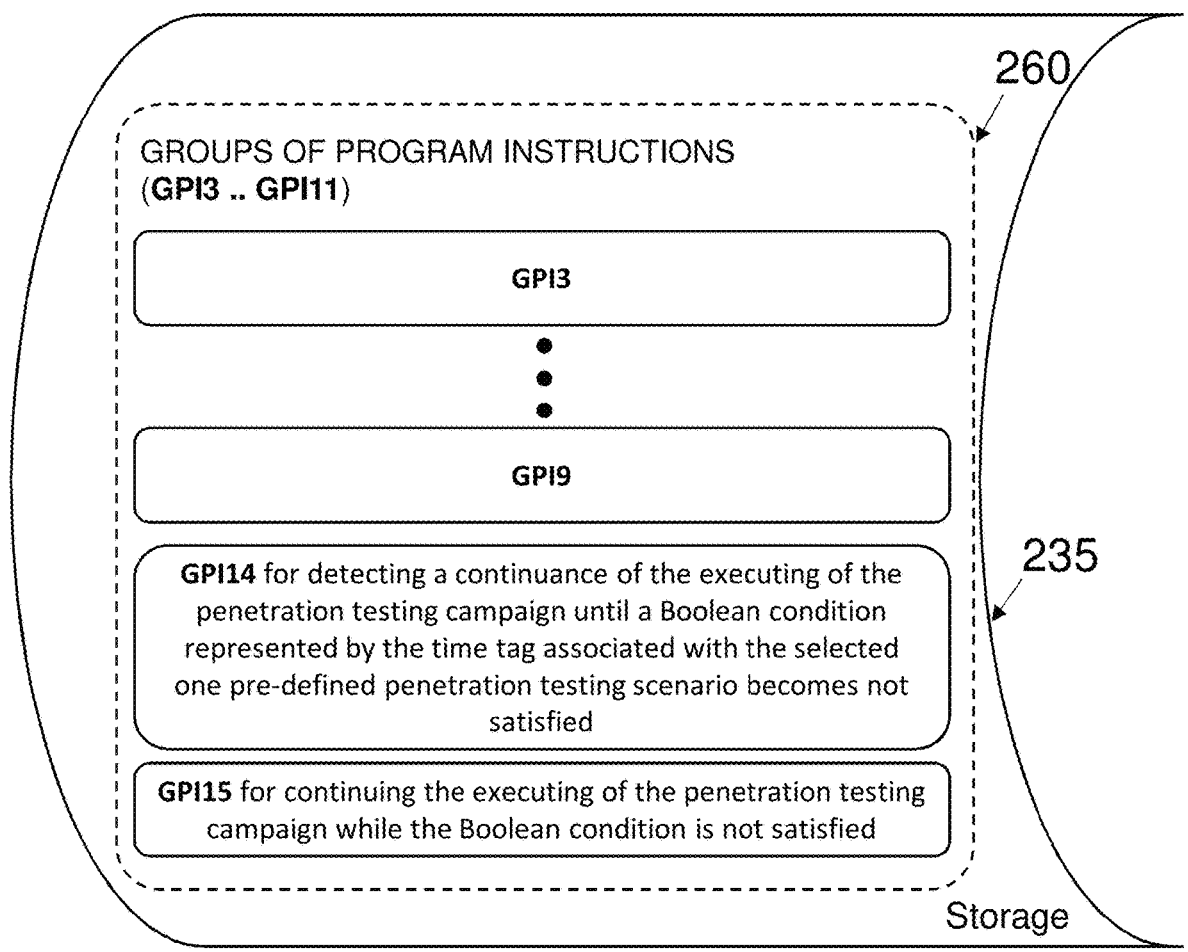

In some embodiments, for example as illustrated in FIG. 6, program instructions 260 comprise groups of program instructions GPI3 . . . GPI9 as above, and additionally comprise groups of program instructions GPI14 and GPI15 for carrying out additional portions of a method for executing a penetration testing campaign by the penetration testing system 200, the additional groups comprising:

a. Group of program instructions GPI14 including program instructions for detecting a continuance of the executing of the penetration testing campaign until a Boolean condition represented by the time tag associated with the selected one pre-defined penetration testing scenario becomes not satisfied. The contents of GPI14 are equivalent to the contents of GPI12, and therefore these two groups of program instructions are interchangeable.

b. Group of program instructions GPI15 including program instructions for continuing the executing of the penetration testing campaign while the Boolean condition is not satisfied.

A number of methods embodying various aspects of the present invention are disclosed herein; in some embodiments, not all steps disclosed for a particular method are necessary, and some or all of the steps of any particular method can be combined with other methods and/or steps from other methods.

Figure 7:
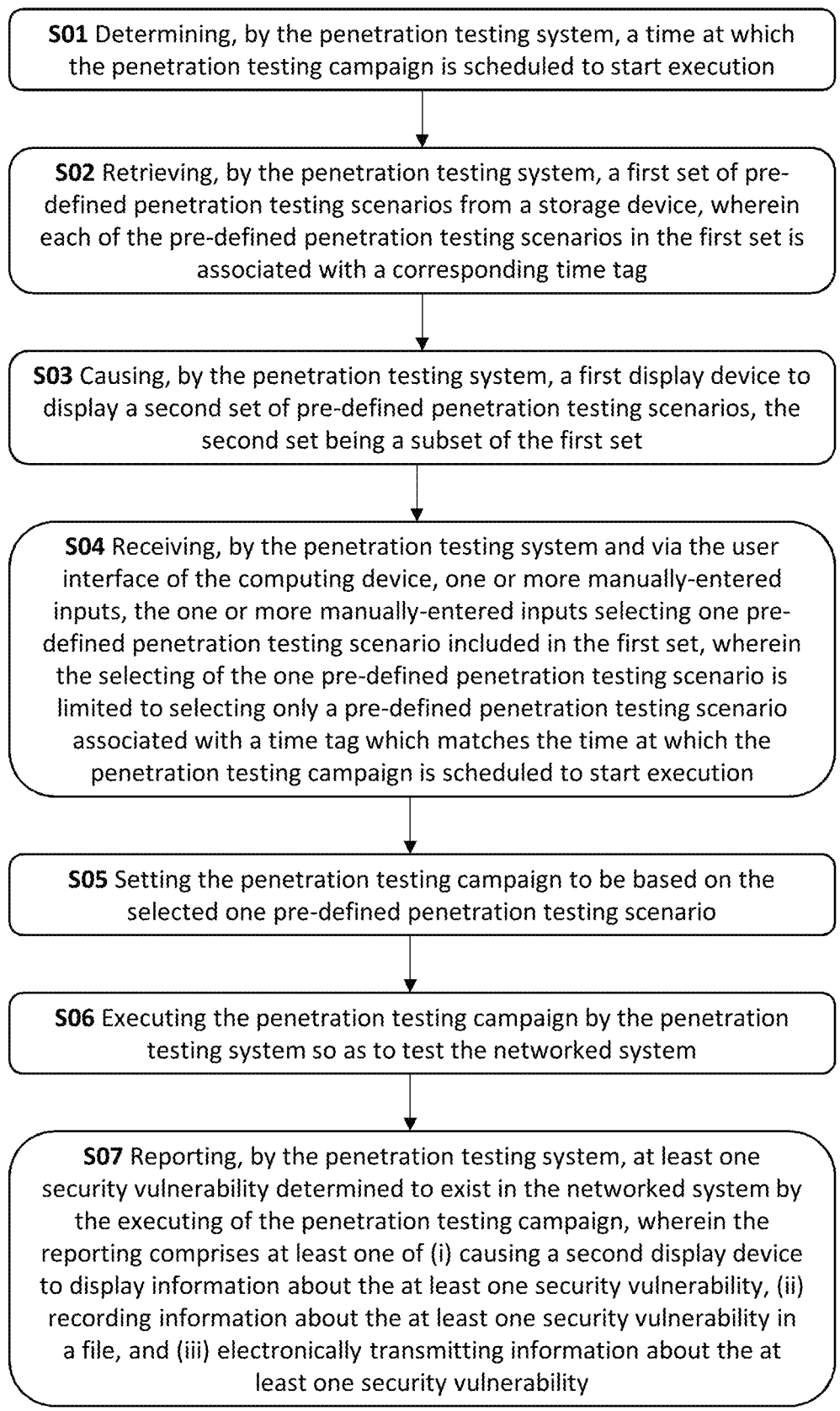
FIGS. 7 through 10 are flow charts of methods disclosed for penetration testing of a networked system by executing a penetration testing campaign by an automated penetration testing system, according to various embodiments.

Referring now to FIG. 7, a method is disclosed for penetration testing of a networked system by executing a penetration testing campaign by an automated penetration testing system. Any penetration system 100 or 200 as disclosed herein that is controlled by a user interface of a computing device (for example, user interface of 150 of computing device 140, or alternatively the user interface—not shown—of computing device 240) is suitable for executing the penetration testing campaign of the method.

The method comprises the following steps:

a. Step S01 determining, by the penetration testing system, a time at which the penetration testing campaign is scheduled to start execution. In some embodiments, the determined time can be the current time. In some embodiments, the determining can include receiving via the user interface of the computing device one or more additional manually-entered inputs selecting the time at which the penetration testing campaign is scheduled to start execution.

b. Step S02 retrieving, by the penetration testing system, a first set of pre-defined penetration testing scenarios from a storage device, wherein each of the pre-defined penetration testing scenarios in the first set is associated with a corresponding time tag.

c. Step S03 causing, by the penetration testing system, a first display device to display a second set of pre-defined penetration testing scenarios, the second set being a subset of the first set.
d. Step S04 receiving, by the penetration testing system and via the user interface of the computing device, one or more manually-entered inputs, the one or more manually-entered inputs selecting one pre-defined penetration testing scenario included in the first set, wherein the selecting of the one pre-defined penetration testing scenario is limited to selecting only a pre-defined penetration testing scenario associated with a time tag which matches the time at which the penetration testing campaign is scheduled to start execution.
e. Step S05 setting the penetration testing campaign to be based on the selected one pre-defined penetration testing scenario. In some embodiments, this can include assigning every information item of the penetration testing campaign a value taken from the corresponding information item of the selected one pre-defined penetration testing scenario. In some embodiments, this can include, for at least one information item of the penetration testing campaign, receiving a value for the one information item, wherein the receiving of the value is from a user of the penetration testing system and via the user interface of the computing device, and the receiving is subsequent to the selecting of the one pre-defined penetration testing scenario.
f. Step S06 executing the penetration testing campaign by the penetration testing system so as to test the networked system.
g. Step S07 reporting, by the penetration testing system, at least one security vulnerability determined to exist in the networked system by the executing of the penetration testing campaign, wherein the reporting comprises at least one of (i) causing a second display device to display information about the at least one security vulnerability, (ii) recording information about the at least one security vulnerability in a file, and (iii) electronically transmitting information about the at least one security vulnerability.

In embodiments, pre-defined penetration testing scenarios in the first set are included in the second set if and only if they are associated with respective time tags that match the time determined in Step S01 at which the penetration testing campaign is scheduled to start execution. In some embodiments, the first set is equal to the second set; in other words: all of the pre-defined scenarios in the first set are displayed in Step S03, but pre-defined testing scenarios not associated with a time tag matching the time determined in Step S01 (the time at which the penetration testing campaign is scheduled to start execution) are marked or otherwise indicated or differentiated on the first display device as being non-selectable.

Figure 8:
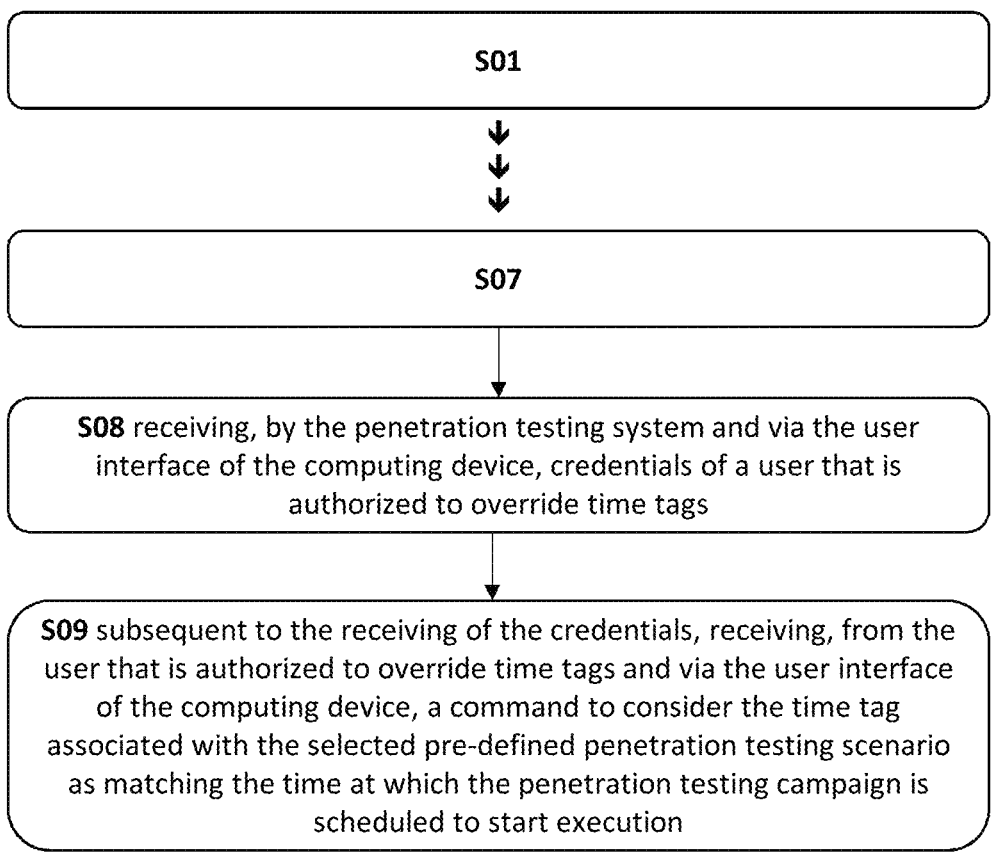

In some embodiments, such as that illustrated in FIG. 8, the method illustrated in FIG. 7 can additionally comprise Steps S08 and S09, such that the method comprises:
a. All of the steps S01 through S07 as above.
b. Step S08 receiving, by the penetration testing system and via the user interface of the computing device, credentials of a user that is authorized to override time tags.
c. Step S09 receiving (subsequent to the receiving of the credentials in Step S08) from the user that is authorized to override time tags, and via the user interface of the computing device, a command to consider the time tag associated with the selected pre-defined penetration testing scenario as matching the time (determined in Step S01) at which the penetration testing campaign is scheduled to start execution. The 'command to consider' can be a command to consider the time tags associated with all the pre-defined penetration testing scenarios in the first set as matching the time at which the penetration testing campaign is scheduled to start execution. The 'command to consider' can be a command to consider the time tag of a single pre-defined penetration testing scenario as matching the time at which the penetration testing campaign is scheduled to start execution.

In some embodiments, the time tag with which the selected pre-defined penetration testing scenario is associated can have the form of a time interval, and the time tag can include one of a starting time and an ending time, a starting time and a time duration, and a time value and plus and minus tolerances. In some embodiments, the time tag with which the selected pre-defined penetration testing scenario is associated can have the form of a time point. A time tag in any of the embodiments herein can be a repeating time tag, which can repeat every day, every week, every month, or every year.

Figure 9:
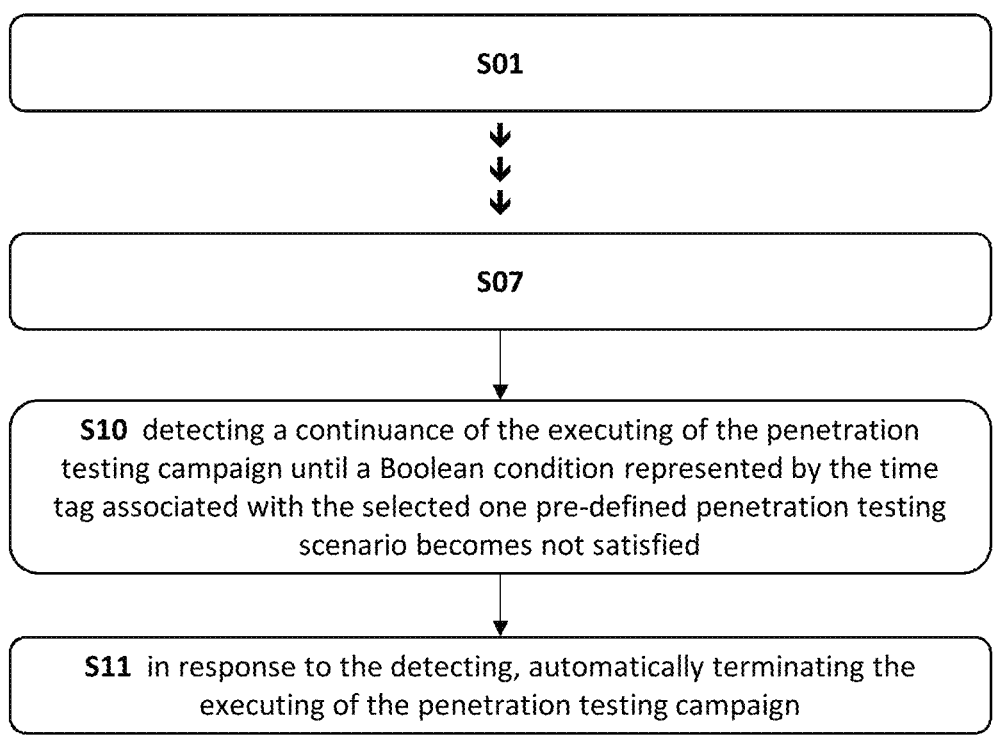

In some embodiments, such as that illustrated in FIG. 9, the method illustrated in FIG. 7 can additionally comprise Steps S10 and S11, such that the method comprises:
a. All of the steps S01 through S07 as above.
b. Step S10 detecting a continuance of the executing of the penetration testing campaign until a Boolean condition represented by the time tag associated with the selected one pre-defined penetration testing scenario becomes not satisfied.
c. Step S11 automatically terminating the executing of the penetration testing campaign, in response to the detecting of Step S08.

Figure 10:
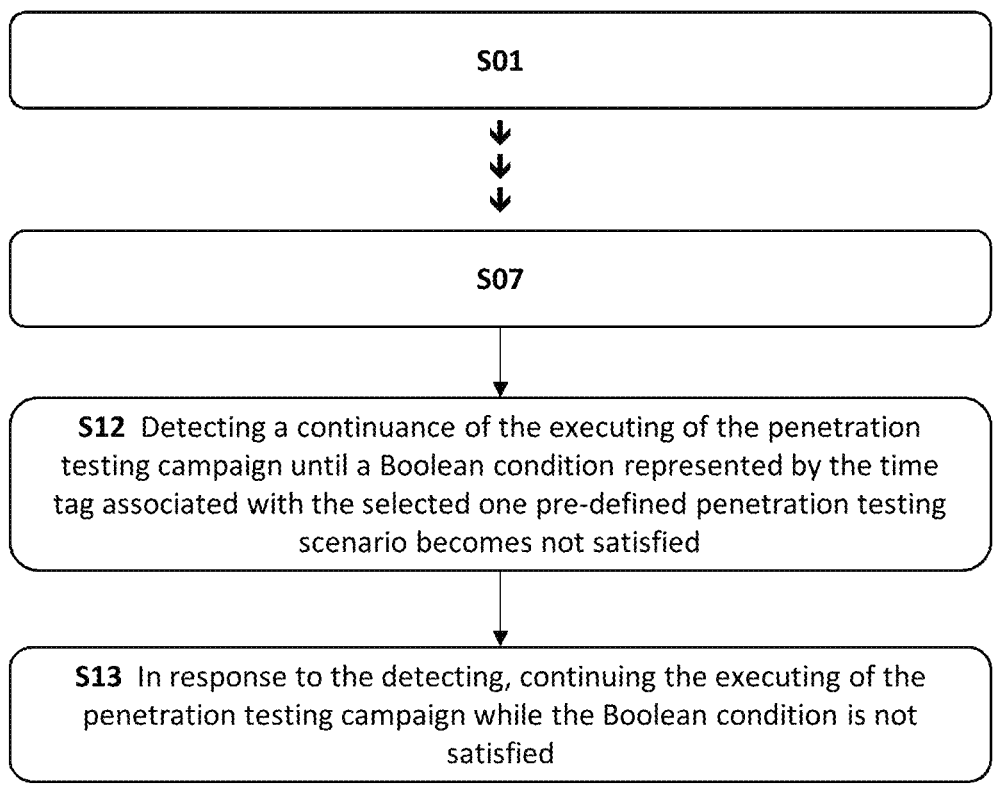

In some embodiments, such as that illustrated in FIG. 10, the method illustrated in FIG. 7 can additionally comprise Steps S12 and S13, such that the method comprises:
a. All of the steps S01 through S07 as above.
b. Step S12 detecting a continuance of the executing of the penetration testing campaign until a Boolean condition represented by the time tag associated with the selected one pre-defined penetration testing scenario becomes not satisfied.
c. Step S13 continuing the executing of the penetration testing campaign while the Boolean condition is not satisfied, in response to the detecting of Step S08.

Figure 11:
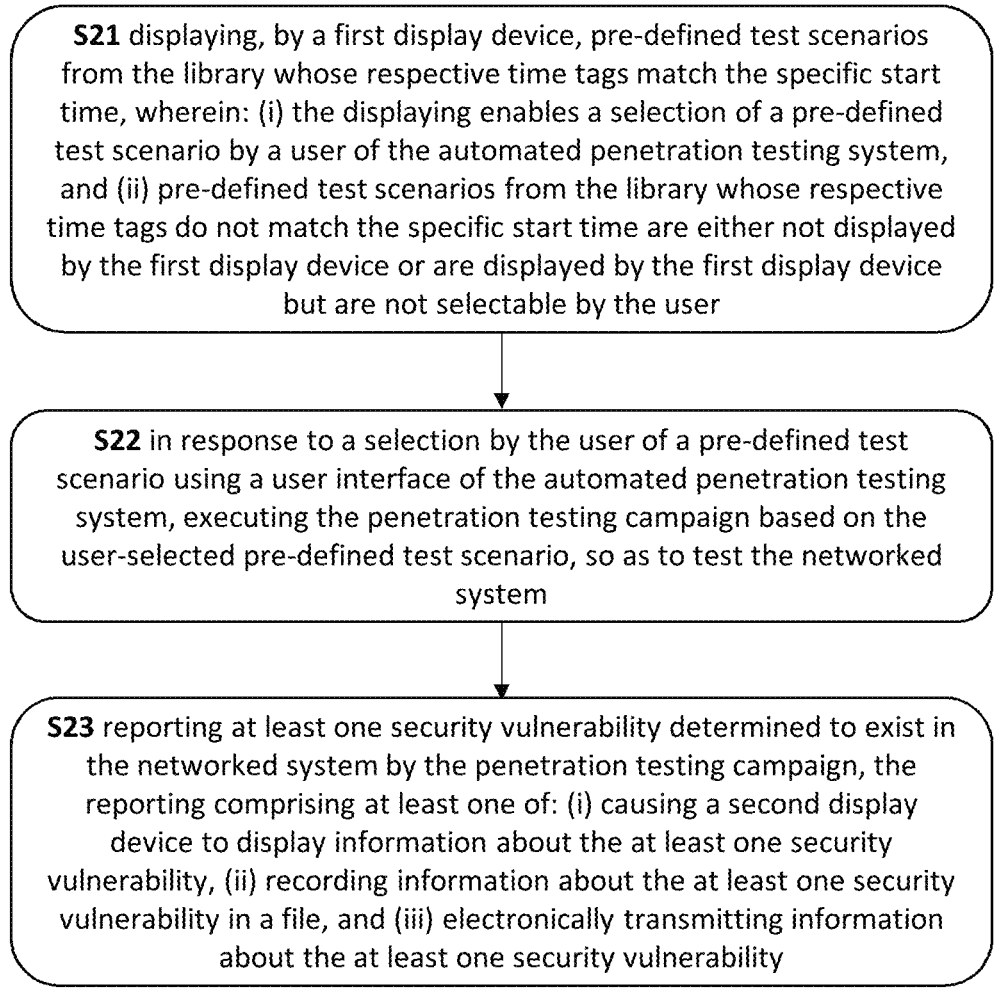
FIGS. 11 through 14 are flow charts of methods disclosed for executing a penetration testing campaign in a networked system using an automated penetration testing system, according to various embodiments.

Referring now to FIG. 11, a method is disclosed for executing a penetration testing campaign in a networked system using an automated penetration testing system. According to the method, the penetration testing campaign is scheduled to start at a specific start time. A suitable automated penetration testing system for performing the method includes a library of multiple pre-defined test scenarios with respective time tags. Any penetration system 100 or 200 as disclosed herein can be suitable for executing the penetration testing campaign of the method.

The method comprises the following steps:
a. Step S21 displaying, by a first display device, pre-defined test scenarios from the library whose respective time tags match the specific start time, wherein: (i) the displaying enables a selection of a pre-defined test scenario by a user of the automated penetration testing system, and (ii) pre-defined test scenarios from the library whose respective time tags do not match the specific start time are either not displayed by the first display device or are displayed by the first display device but are not selectable by the user.
   b. Step S22 in response to a selection by the user of a pre-defined test scenario using a user interface of the automated penetration testing system, executing the penetration testing campaign based on the user-selected pre-defined test scenario, so as to test the networked system. In some embodiments, the executing can include assigning every information item of the penetration testing campaign a value taken from the corresponding information item of the selected pre-defined test scenario. In some embodiments, the executing can include receiving a value for at least one information item of the penetration testing campaign, wherein the receiving of the value is from the user of the automated penetration testing system and via the user interface of the automated penetration testing system, and the receiving is subsequent to the selection by the user of a pre-defined test scenario.
   c. Step S23 reporting at least one security vulnerability determined to exist in the networked system by the penetration testing campaign, the reporting comprising at least one of: (i) causing a second display device to display information about the at least one security vulnerability, (ii) recording information about the at least one security vulnerability in a file, and (iii) electronically transmitting information about the at least one security vulnerability.

Figure 12:
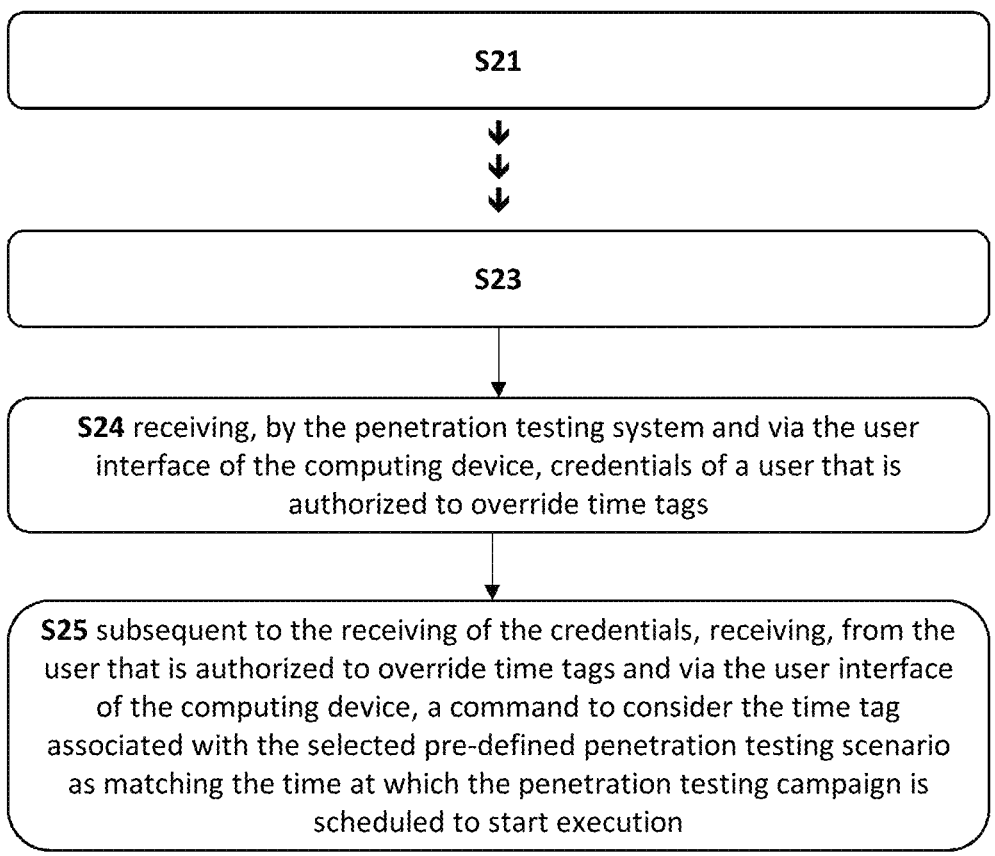

In some embodiments, the user interface of Step S22 can comprise the first display device of Step S21. In some embodiments, time at which the penetration testing campaign is scheduled to start execution can be the current time. In some embodiments, the time at which the penetration testing campaign is scheduled to start execution can be received, by the automated penetration testing system, via the user interface of the automated penetration testing system. In some embodiments, such as that illustrated in FIG. 12, the method illustrated in FIG. 11 can additionally comprise Steps S24 and S25, such that the method comprises:
   a. All of the steps S21 through S23 as above.
   b. Step S24 receiving, by the penetration testing system and via the user interface of the computing device, credentials of a user that is authorized to override time tags.
   c. Step S25 receiving (subsequent to the receiving of the credentials in Step S24) from the user that is authorized to override time tags, and via the user interface of the computing device, a command to consider the time tag associated with the selected pre-defined penetration testing scenario as matching the time at which the penetration testing campaign is scheduled to start execution. The 'command to consider' can be a command to consider the time tags associated with all the pre-defined penetration testing scenarios as matching the time at which the penetration testing campaign is scheduled to start execution. The 'command to consider' can be a command to consider the time tag of a single pre-defined penetration testing scenario as matching the time at which the penetration testing campaign is scheduled to start execution.

In some embodiments, the respective time tag of the selected pre-defined test scenario can have the form of a time interval, and the time tag can include one of a starting time and an ending time, a starting time and a time duration, and a time value and plus and minus tolerances. In some embodiments, the respective time tag of the selected pre-defined test scenario can have the form of a time point. A time tag in any of the embodiments herein can be a repeating time tag, which can repeat every day, every week, every month, or every year.

Figure 13:
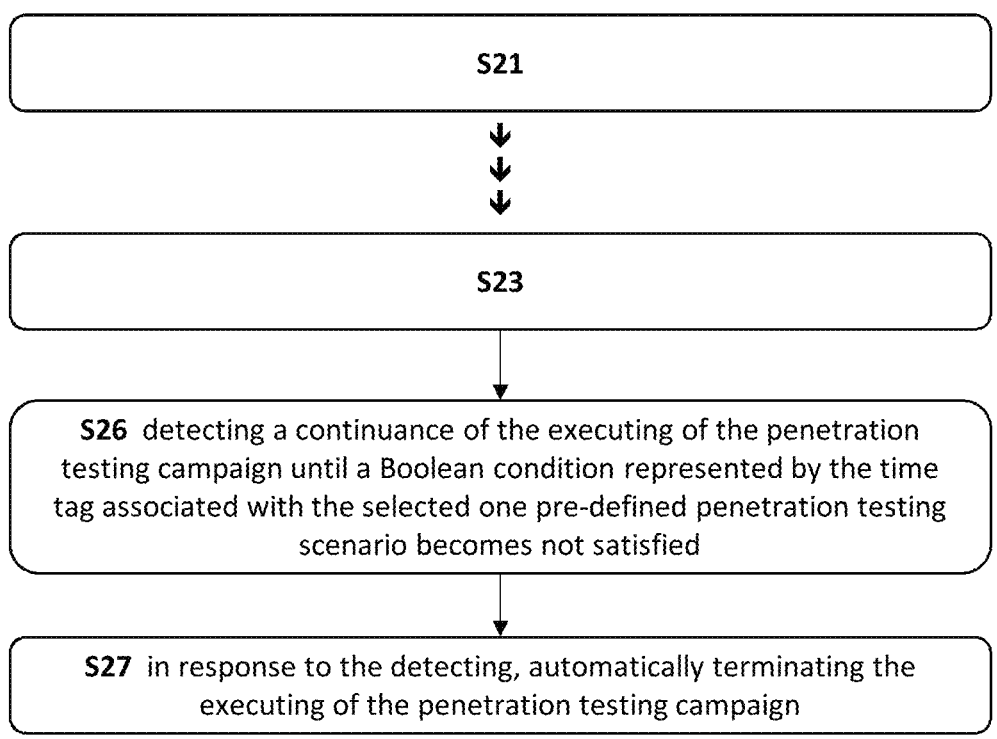

In some embodiments, such as that illustrated in FIG. 13, the method illustrated in FIG. 11 can additionally comprise Steps S26 and S27, such that the method comprises:
   a. All of the steps S21 through S23 as above.
   b. Step S26 detecting a continuance of the executing of the penetration testing campaign until a Boolean condition represented by the respective time tag of the selected pre-defined test scenario becomes not satisfied.
   c. Step S27 automatically terminating the executing of the penetration testing campaign, in response to the detecting of Step S26.

Figure 14:
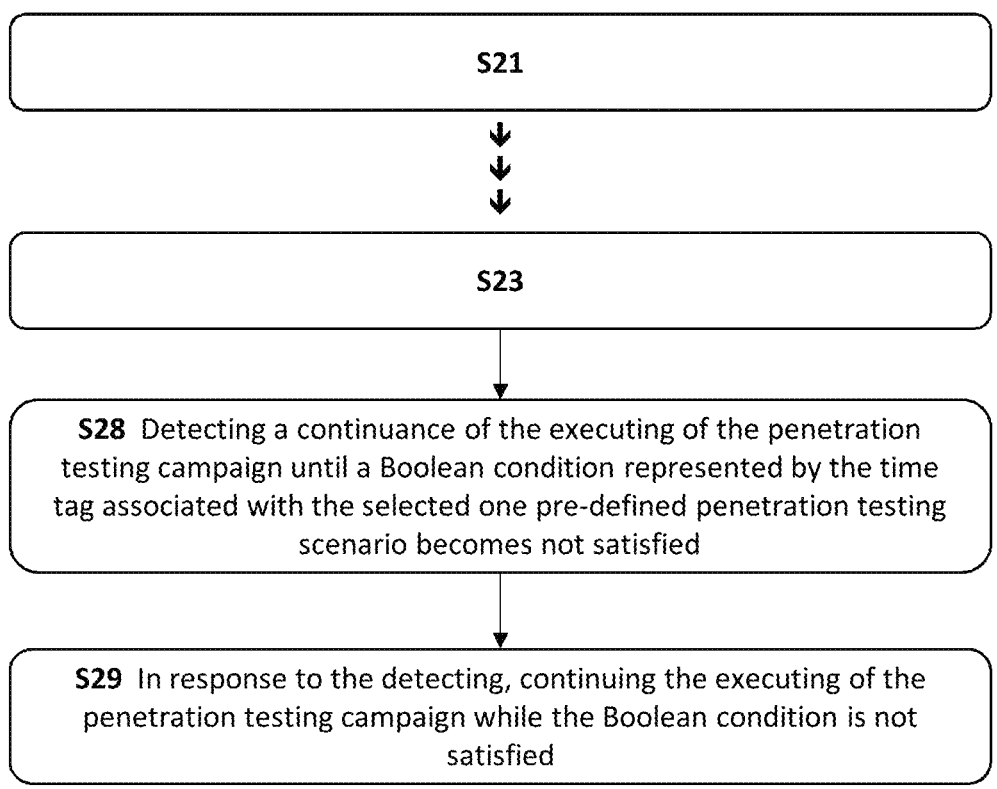

In some embodiments, such as that illustrated in FIG. 14, the method illustrated in FIG. 11 can additionally comprise Steps S28 and S29, such that the method comprises:
   a. All of the steps S21 through S23 as above.
   b. Step S28 detecting a continuance of the executing of the penetration testing campaign until a Boolean condition represented by the respective time tag of the selected pre-defined test scenario becomes not satisfied.
   c. Step S29 continuing the executing of the penetration testing campaign while the Boolean condition is not satisfied, in response to the detecting of Step S28.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

DEFINITIONS

This disclosure should be interpreted according to the definitions below.

In case of a contradiction between the definitions in this Definitions section and other sections of this disclosure, this section should prevail.

In case of a contradiction between the definitions in this section and a definition or a description in any other document, including in another document incorporated in this disclosure by reference, this section should prevail, even if the definition or the description in the other document is commonly accepted by a person of ordinary skill in the art.

1. "computing device"—Any device having a processing unit into which it is possible to install code that can be executed by the processing unit. The installation of the code may be possible even while the device is operative in the field or it may be possible only in the factory.

2. "peripheral device"—Any device, whether a computing device or not, that provides input or output services to at least one other device that is a computing device. Examples of peripheral devices are printers, plotters, scanners, environmental sensors, smart-home controllers, digital cameras, speakers and display screens. A peripheral device may be directly connected to a single computing device or may be connected to a communication system through which it can communicate with one or more computing devices. A storage device that is (i) not included in or directly connected to a single computing device, and (ii) accessible by multiple computing devices, is a peripheral device.

3. "network" or "computing network"—A collection of computing devices and peripheral devices which are all connected to common communication means that allow direct communication between any two of the devices without requiring passing the communicated data through a third device. The network includes both the connected devices and the communication means. A network may be wired or wireless or partially wired and partially wireless.

4. "networked system" or "networked computing system"—One or more networks that are interconnected so that communication is possible between any two devices of the one or more networks, even if they do not belong to the same network. The connection between different networks of the networked system may be achieved through dedicated computing devices, and/or through computing devices that belong to multiple networks of the networked system and also have other functionality in addition to connecting between networks. The networked system includes the one or more networks, any connecting computing devices and also peripheral devices accessible by any computing device of the networked system. Note that a single network is a networked system having only one network, and therefore a network is a special case of a networked system.

5. "module"—A portion of a system that implements a specific task. A module may be composed of hardware, software or any combination of both. For example, in a module composed of both hardware and software, the hardware may include a portion of a computing device, a single computing device or multiple computing devices, and the software may include software code executed by the portion of the computing device, by the single computing device or by the multiple computing devices. A computing device associated with a module may include one or more processors and computer readable storage medium (non-transitory, transitory or a combination of both) for storing instructions or for executing instructions by the one or more processors.

6. "network node of a networked system" or "node of a networked system"—Any computing device or peripheral device that belongs to the networked system.

7. "security vulnerability of a network node" or "vulnerability of a network node"—A weakness which allows an attacker to compromise the network node. A vulnerability of a network node may be caused by one or more of a flawed configuration of a component of the network node, a flawed setting of a software module in the network node, a bug in a software module in the network node, a human error while operating the network node, having trust in an already-compromised other network node, and the like.

A weakness that allows an attacker to compromise a network node only conditionally, depending on current conditions in the network node or in the networked system in which the network node resides, is still a vulnerability of the network node, but may also be referred to as a "potential vulnerability of the network node". For example, a vulnerability that compromises any network node running the Windows 7 Operating System, but only if the network node receives messages through a certain Internet port, can be said to be a vulnerability of any Windows 7 network node, and can also be said to be a potential vulnerability of any such node. Note that in this example the potential vulnerability may fail in compromising the node either because the certain port is not open (a condition in the node) or because a firewall is blocking messages from reaching the certain port in the node (a condition of the networked system).

8. "security vulnerability of a networked system" or "vulnerability of a networked system"—A weakness which allows an attacker to compromise the networked system. A vulnerability of a networked system may be caused by one or more of a vulnerability of a network node of the networked system, a flawed configuration of a component of the networked system, a flawed setting of a software module in the networked system, a bug in a software module in the networked system, a human error while operating the networked system, and the like.

A weakness that allows an attacker to compromise a networked system only conditionally, depending on current conditions in the networked system, is still a vulnerability of the networked system, but may also be referred to as a "potential vulnerability of the networked system". For example, if a network node of the networked has a potential vulnerability then that vulnerability can be said to be a vulnerability of the networked system, and can also be said to be a potential vulnerability of the networked system.

9. "validating a vulnerability" or "validating a potential vulnerability" (for a given network node or for a given networked system)—Verifying that the vulnerability compromises the given network node or the given networked system under the conditions currently existing in the given network node or the given networked system.

The validation of the vulnerability may be achieved by actively attempting to compromise the given network node or the given networked system and then checking if the compromising attempt was successful. Such validation is referred to as "active validation".

Alternatively, the validation of the vulnerability may be achieved by simulating the exploitation of the vulnerability or by otherwise evaluating the results of such exploitation without actively attempting to compromise the given network node or the given networked system. Such validation is referred to as "passive validation".

10. "vulnerability management"—A cyclical practice of identifying, classifying, remediating, and mitigating vulnerabilities of network nodes in a networked system.

11. "penetration testing" or "pen testing" (in some references also known as "red team assessment" or "red team testing", but in other references those terms referring to a red team have a different meaning than "penetration testing")—A process in which a networked system is evaluated in order to determine if it can be compromised by an attacker by utilizing one or more security vulnerabilities of the networked system. If it is determined that the networked system can be compromised, then the one or more security vulnerabilities of the networked system are identified and reported.

Unlike a vulnerability management process which operates at the level of isolated vulnerabilities of individual network nodes, a penetration test may operate at a higher level which considers vulnerabilities of multiple network nodes that might be jointly used by an attacker to compromise the networked system.

A penetration testing process involves at least the following functions: (i) a reconnaissance function, (ii) an attack function, and (iii) a reporting function. It should be noted that the above functions do not necessarily operate sequentially according to the above order, but may operate in parallel or in an interleaved mode. Unless otherwise explicitly specified, a reference to penetration testing should be understood as referring to automated penetration testing.

12. "automated penetration testing"—Penetration testing in which at least one of the reconnaissance function, the attack function and the reporting function is at least partially automated.

13. "penetration testing system"—A system capable of performing penetration testing, regardless if composed of hardware, software or combination of both.

14. "reconnaissance function" or "recon function"—The function in a penetration testing process that handles collection of data about the tested networked system. The collected data may include internal data of one or more network nodes of the tested networked system. Additionally, the collected data may include data about communication means of the tested networked system and about peripheral devices of the tested networked system. The collected data may also include data that is only indirectly related to the tested networked system, for example business intelligence data about the organization owning the tested networked system, collected in order to use it for assessing importance of resources of the networked system.

The functionality of a reconnaissance function may be implemented by any combination of (i) software executing in a remote computing device, where the remote computing device may probe the tested networked system for the purpose of collecting data about it, (ii) hardware and/or software simulating or duplicating the tested networked system, (iii) a reconnaissance agent software module executing in one or more network nodes of the tested networked system.

15. "attack function"—The function in a penetration testing process that handles determination of whether one or more security vulnerabilities exist in the tested networked system. The determination is based on data collected by the reconnaissance function of the penetration testing. The attack function generates data about each of the identified security vulnerabilities, if any.

The functionality of an attack function may be implemented by any combination of (i) software executing in a remote computing device, where the remote computing device may attack the tested networked system for the purpose of verifying that it can be compromised, (ii) hardware and/or software simulating or duplicating the tested networked system, (iii) an attack agent software module executing in one or more network nodes of the tested networked system. The methods used by an attack function may include executing a real attack on the tested networked system by attempting to change at least one setting, mode or state of a network node or of a hardware or software component of a network node, in order to verify that the tested networked system may be compromised. In such case, the attempt may result in actually compromising the tested networked system. Alternatively, the methods used by an attack function may be such that whenever there is a need to verify whether a setting, a mode or a state of a network node or of a hardware or software component of a network node can be changed in a way that compromises the tested networked system, the verification is done by simulating the effects of the change or by otherwise evaluating them without ever actually compromising the tested networked system.

16. "reporting function"—The function in a penetration testing process that handles reporting of results of the penetration testing. The reporting comprises at least one of (i) causing a display device to display a report including information about the results of the penetration testing, (ii) recording a report including information about the results of the penetration testing in a file, and (iii) electronically transmitting a report including information about the results of the penetration testing.

The functionality of a reporting function may be implemented by software executing in a remote computing device, for example in the computing device implementing the attack function of the penetration testing.

17. "recovery function" or "clean-up function"—The function in a penetration testing process that handles cleaning-up after a penetration test. The recovery includes undoing any operation done during the penetration testing process that results in compromising the tested networked system.

The functionality of a recovery function may be implemented by any combination of (i) software executing in a remote computing device, for example in the computing device implementing the attack function of the penetration testing, (ii) an attack agent software module executing in one or more network nodes of the tested networked system.

18. "a campaign of penetration testing" or "penetration testing campaign"—A specific run of a specific test of a specific networked system by the penetration testing system.

19. "results of a penetration testing campaign"—Any output generated by the penetration testing campaign. This includes, among other things, data about any security vulnerability of the networked system tested by the penetration testing campaign that is detected by the campaign. It should be noted that in this context the word "results" is used in its plural form regardless of the amount of output data generated by the penetration testing campaign, including when the output consists of data about a single security vulnerability.

20. "information item of a campaign"—A variable data item that a penetration testing system must know its value before executing the campaign. Note that a data item must be able to have different values at different campaigns in order to be considered an information item of the campaign. If a data item always has the same value for all campaigns, it is not an information item of the campaign, even if it must be known and is being used by the penetration testing system when executing the campaign.

An information item of a campaign is either a primary information item of the campaign or a secondary information item of the campaign.

A type of an attacker and a goal of an attacker are examples of information items of a campaign. Another example of an information item of a campaign that is more complex than the previous two simple examples is a subset of the network nodes of the networked system that is assumed to be already compromised at the time of beginning the penetration testing campaign, with the subset defined either by an explicit selection of network nodes or by a Boolean condition each node of the subset has to satisfy.

A value of an information item may be composed either of a simple value or of both a main value and one or more auxiliary values. If a specific main value of an information item requires one or more auxiliary values that complete the full characterization of the value, then the combination of the main value and the one or more auxiliary values together is considered to be the value assigned to the information item. For example, for a "goal of the attacker" information item, after a user selects a main value of "exporting a specific file from whatever node having a copy of it", the user still has to provide a file name as an auxiliary value in order for the goal information item to be fully characterized. In this case the combination of "exporting a specific file from whatever node having a copy of it" and the specific file name is considered to be the value of the "goal of the attacker" information item.

21. "primary information item of a campaign"—An information item of the campaign which is completely independent of previously selected values of other information items of the campaign. In other words, the options available to a user for selecting the value of a primary information item of the campaign are not dependent on any value previously selected for any another information item of the campaign. For example, the options available to the user for selecting a goal of the attacker are independent of values previously selected for any other information item of the campaign, and therefore the goal of the attacker is a primary information item of the campaign.

22. "secondary information item of a campaign"—An information item of the campaign which depends on at least one previously selected value of another information item of the campaign. In other words, the options available to a user for selecting the value of a secondary information item of the campaign depend on at least one value previously selected for another information item of the campaign. For example, the options available to the user for selecting a capability of an attacker may depend on the previously selected value of the type of the attacker. For a first type of attacker the available capabilities to select from may be a first group of capabilities, while for a second type of attacker the available capabilities to select from may be a second group of capabilities, different from the first group. Therefore, a capability of the attacker is a secondary information item of the campaign.

23. "specifications of a campaign" or "scenario"—A collection of values assigned to all information items of the campaign. As having a value for each information item of a campaign is essential for running it, a campaign of a penetration testing system cannot be run without providing the penetration testing system with full specifications of the campaign. A value of an information item included in the specifications of a campaign may be manually selected by a user or may be automatically determined by the penetration testing system. In the latter case, the automatic determination by the system may depend on one or more values selected by the user for one or more information items of the campaign, or it may be independent of any selection by the user. For example, the selection of the capabilities of the attacker may automatically be determined by the system based on the user-selected type of the attacker, and the lateral movement strategy of the attacker may be automatically determined by the system independently of any user selection.

24. "pre-defined scenario", "pre-defined test scenario", "scenario template" or "template scenario"—A scenario that exists in storage accessible to a penetration testing system before the time a campaign is started, and can be selected by a user of the penetration testing system for defining a campaign of penetration testing.
A pre-defined scenario may be created and provided by the provider of the penetration testing system and may be part of a library of multiple pre-defined scenarios. Alternatively, a pre-defined scenario may be created by the user of the penetration testing system using a scenario editor provided by the provider of the penetration testing system.
A penetration testing system may require that a campaign of penetration testing that is based on a pre-defined scenario must have all its values of information items taken from the pre-defined scenario, with no exceptions. Alternatively, a penetration testing system may allow a user to select a pre-defined scenario and then override and change one or more values of information items of a campaign that is based on the pre-defined scenario.

25. "attacker" or "threat actor"—An entity, whether a single person, a group of persons or an organization, that might conduct an attack against a networked system by penetrating it for uncovering its security vulnerabilities and/or for compromising it.

26. "a type of an attacker"—A classification of the attacker that indicates its main incentive in conducting attacks of networked systems. Typical values for a type of an attacker are state-sponsored, opportunistic cyber criminal, organized cyber criminal and insider.
An attacker can have only a single type.

27. "a capability of an attacker"—A tool in the toolbox of the attacker. A capability describes a specific action that the attacker can perform. Examples of capabilities are copying a local file of a network node and exporting it to the attacker out of the networked system and remotely collecting database information from an SQL server of the networked system. In some systems, selecting a type of an attacker causes a corresponding default selection of capabilities for that type of attacker, but the user may have an option to override the default selection and add or delete capabilities. An attacker can have one or multiple capabilities.

28. "a goal of an attacker"—What the attacker of a campaign is trying to achieve when attacking a targeted networked system. In other words, what is the criterion according to which it will be judged whether the attack was a success or a failure and/or to what extent was it a success or a failure. Selecting a type of an attacker may cause a default selection of a goal for that attacker, but the user may have an option to override the default selection. An attacker can have one or multiple goals.

29. "a lateral movement strategy of an attacker"—A decision logic applied by the attacker of a campaign for selecting the next network node to try to compromise. During a penetration testing campaign, the attacker is assumed to make progress by an iterative process in which in each iteration he selects the next node to attack, based on the group of network nodes he already controls (i.e. that are already compromised). If the attack on the selected node is successful, that node is added to the group of nodes that are already compromised, and another iteration starts. If the attempt to compromise the selected node fails, another node is selected, either according to some other rule or randomly. It should be noted that all types of penetration testing systems, whether using simulated penetration testing, actual attack penetration testing or some other form of penetration testing, must use a lateral movement strategy. In the case of a penetration testing system that actually attacks the tested networked system, the lateral movement strategy selects the path of attack actually taken through the networked system. In the case of a penetration testing system that simulates or evaluates the results of attacking the tested networked system, the lateral movement strategy selects the path of attack taken in the simulation or the evaluation through the networked system. Therefore in the above explanation, the term "attack" should be understood to mean "actual attack or simulated attack", the term "already controls" should be understood to mean "already controls or already determined to be able to control", the term "already compromised" should be understood to mean "already compromised or already determined to be compromisable", etc.
A simple example of a lateral movement strategy is a "depth first" strategy. In such strategy, the next network node to try to compromise is an immediate neighbor of the last network node that was compromised that is not yet compromised (provided such neighbor node exists). Two network nodes are "immediate neighbors" of each other if and only if they have a direct communication link between them that does not pass through any other network node.

Another simple example is a "breadth search" strategy. In such strategy, the next network node to try to compromise is a network node whose distance from the first node compromised by the campaign is the smallest possible. The distance between two network nodes is the number of network nodes along the shortest path between them, plus one. A path is an ordered list of network nodes in which each pair of adjacent nodes in the list is a pair of immediate neighbors. Thus, the distance between two immediate neighbors is one.

An example of a more advanced lateral movement strategy is a strategy that is applicable when a goal of the attacker is related to a resource of the networked system that resides in a specific network node. In such case the next network node to try to compromise may be selected by determining the shortest path in the networked system leading from an already compromised node to the specific node containing the desired resource, and picking the first node on this path to be the next node to try to compromise. Note that if the shortest path has a length of one (which happens when the specific node is an immediate neighbor of an already compromised node), then the next node to try to compromise is the specific node containing the desired resource. Another example of a lateral movement strategy is a strategy that gives priority to network nodes satisfying a specific condition, for example nodes that are known to have a specific weakness, such as running the Windows XP operating system. In such case the next node to try to compromise is a node that satisfies the condition and is also an immediate neighbor of an already compromised node (if such node exists). Selecting a type of an attacker may cause a default selection of a lateral movement strategy for that attacker, but the user may have an option to override the default selection. An attacker can only have a single lateral movement strategy.

30. "penetration testing by simulation" or "simulated penetration testing"—Penetration testing in which (i) the functionality of the reconnaissance function is fully implemented by software executing by a remote computing device and/or by hardware and/or software simulating or duplicating the tested networked system, where the remote computing device may probe the tested networked system for the purpose of collecting data about it, as long as this is done without risking compromising the tested networked system, and (ii) the methods used by the attack function are such that whenever there is a need to verify whether a setting, a mode or a state of a network node or of a hardware or software component of a network node can be changed in a way that compromises the tested networked system, the verification is done by simulating the effects of the change or by otherwise evaluating them without risking compromising the tested networked system.

31. "penetration testing by actual attack" or "actual attack penetration testing" or "penetration testing by actual exploit" or "actual exploit penetration testing"—Penetration testing in which (i) the functionality of the reconnaissance function is fully implemented by (A) software executing in a remote computing device, where the remote computing device may probe the tested networked system for the purpose of collecting data about it even if this risks compromising the tested networked system, and/or by (B) software executing in one or more network nodes of the tested networked system that analyzes network traffic and network packets of the tested networked system for collecting data about it, and (ii) the methods used by the attack function include executing a real attack on the tested networked system by attempting to change at least one setting, mode or state of a network node or of a hardware or software component of a network node in order to verify that the tested networked system may be compromised, such that the attempt may result in compromising the tested networked system.

32. "penetration testing by reconnaissance agents" or "reconnaissance agent penetration testing"—Penetration testing in which (i) the functionality of the reconnaissance function is at least partially implemented by a reconnaissance agent software module installed and executed in each one of multiple network nodes of the tested networked system, where the data collected by at least one instance of the reconnaissance agent software module includes internal data of the network node in which it is installed, and the data collected by at least one instance of the reconnaissance agent software module is at least partially collected during the penetration testing process, and (ii) the methods used by the attack function are such that whenever there is a need to verify whether a setting, a mode or a state of a network node or of a hardware or software component of a network node can be changed in a way that compromises the tested networked system, this is done by simulating the effects of the change or by otherwise evaluating them without risking compromising the tested networked system.

33. "reconnaissance client agent", "reconnaissance agent" or "recon agent"—A software module that can be installed on a network node and can be executed by a processor of that network node for partially or fully implementing the reconnaissance function of a penetration test. A reconnaissance agent must be capable, when executed by a processor of the network node in which it is installed, of collecting data at least about some of the events occurring in the network node. Such events may be internal events of the network node or messages sent out of the network node or received by the network node. A reconnaissance agent may be capable of collecting data about all types of internal events of its hosting network node. Additionally, it may be capable of collecting other types of data of its hosting network node. A reconnaissance agent may additionally be capable of collecting data about other network nodes or about other components of a networked system containing the hosting network node. A reconnaissance agent may be persistently installed on a network node, where "persistently" means that once installed on a network node the reconnaissance agent survives a reboot of the network node. Alternatively, a reconnaissance agent may be non-persistently installed on a network node, where "non-persistently" means that the reconnaissance agent does not survive a reboot of the network node and consequently should be installed again on the network node for a new penetration test in which the network node takes part, if the network node was rebooted since the previous penetration test in which it took part.

34. "attack client agent" or "attack agent"—A software module that can be installed on a network node and can be executed by a processor of that network node for partially or fully implementing the attack function of a penetration test. Typically, an attack agent is installed by an actual attack penetration testing system in a network node that it had succeeded to compromise during a penetration test. Once installed on such network node, the attack agent may be used as a tool for compromising other network nodes in the same networked system. In such case, the attack agent may include code that when executed by a processor of the compromised network node compromises another network node that is adjacent to it in the networked system, possibly taking advantage of the high level of trust it may have from the point of view of the adjacent network node. Another type of an attack agent may include code that when executed by a processor of a network node determines whether that network node would be compromised if a given operation is performed.

35. "penetration testing software module" or "remote computing device penetration testing software module"—A software module that implements the full functionality of a penetration testing system, except for the functionality implemented by (i) reconnaissance agents, (ii) attack agents, and (iii) hardware and/or software simulating or duplicating the tested networked system, if such components are used in the implementation of the penetration testing system.
The penetration testing software module may be installed and executed on a single computing device or comprise multiple software components that reside on multiple computing devices. For example, a first component of the penetration testing software module may implement part or all of the reconnaissance function and be installed and executed on a first computing device, a second component of the penetration testing software module may implement part or all of the attack function and be installed and executed on a second computing device, and a third component of the penetration testing software module may implement the reporting function and be installed and executed on a third computing device.

36. "resource of a networked system"—A file in a network node of the networked system, a folder in a network node of the networked system, credentials of a user of the networked system, a peripheral device of a network node of the networked system, or a peripheral device directly attached to a network of the networked system.

37. "compromising a network node"—Successfully causing execution of an operation in the network node that is not allowed for the entity requesting the operation by the rules defined by an administrator of the network node, or successfully causing execution of code in a software module of the network node that was not predicted by the vendor of the software module. Examples for compromising a network node are reading a file without having read permission for it, modifying a file without having write permission for it, deleting a file without having delete permission for it, exporting a file out of the network node without having permission to do so, getting an access right higher than the one originally assigned without having permission to get it, getting a priority higher than the one originally assigned without having permission to get it, changing a configuration of a firewall network node such that it allows access to other network nodes that were previously hidden behind the firewall without having permission to do it, and causing execution of software code by utilizing a buffer overflow. As shown by the firewall example, the effects of compromising a certain network node are not necessarily limited to that certain network node. In addition, executing successful ARP spoofing, denial-of-service, man-in-the-middle or session-hijacking attacks against a network node are also considered compromising that network node, even if not satisfying any of the conditions listed above in this definition.

38. "ARP spoofing"—a technique for compromising a target network node in which an attacker sends a false Address Resolution Protocol (ARP) reply message to the target network node. The aim is to associate an attacker's MAC address (either a MAC address of the node sending the false ARP reply message or a MAC address of another node controlled by the attacker) with the IP address of another host, such as the default gateway, causing any traffic sent by the target node and meant for that IP address to be sent to the attacker instead. ARP spoofing may allow an attacker to intercept data frames on a network, modify the traffic, or stop all traffic to a certain node. Often the attack is used as an opening for other attacks, such as denial-of-service, man-in-the-middle, or session-hijacking attacks.

39. "denial-of-service attack"—a cyber-attack where an attacker seeks to make a service provided by a network node to other network nodes unavailable to its intended users either temporarily or indefinitely. The denial-of-service attack may be accomplished by flooding the node providing the targeted service with superfluous requests in an attempt to overload it and prevent some or all legitimate requests from being fulfilled. Alternatively, the denial-of-service attack may be accomplished by causing some or all of the legitimate requests addressed to the targeted service to not reach their destination.

40. "man-in-the-middle attack"—a cyber-attack where an attacker secretly relays and possibly alters the communication between two network nodes who believe they are directly communicating with each other. One example of man-in-the-middle attacks is active eavesdropping, in which the attacker makes independent connections with the victims and relays messages between them to make them believe they are communicating directly with each other, when in fact the entire communication session is controlled by the attacker. The attacker must be able to intercept all relevant messages passing between the two victims and inject new ones.

41. "session-hijacking attack"—a cyber-attack where a valid communication session between two network nodes in a networked system is used by an attacker to gain unauthorized access to information or services in the networked computer system.

42. "compromising a networked system"—Compromising at least one network node of the networked system or successfully causing execution of an operation in the networked system that is not allowed for the entity requesting the operation by the rules defined by an administrator of the networked system. Examples for operations in the networked system that may not be allowed are exporting a file out of the networked system without having permission to do so, sending a file to a network printer without having permission to do so, and copying a file from one network node to another network node without having permission to do so.

43. "compromising a software application"—Successfully causing the software application to execute an operation that is not allowed for the entity requesting the operation by the rules defined by an administrator of the network node on which the software application is installed or by a vendor of the software application, or successfully causing the execution of code in the software application that was not predicted by the vendor of the software application. Examples for compromising a software application are changing a configuration file controlling the operation of the software application without having permission for doing so, and activating a privileged function of the software application without having permission for doing so. In addition, causing the software application to execute a macro without checking rights of the macro code to do what it is attempting to do is also considered compromising that software application, even if not satisfying any of the conditions listed above in this definition.

44. "administrator of a network node"—Any person that is authorized, among other things, to define or change at least one rule controlling at least one of an access right, a permission, a priority and a configuration in the network node.

45. "administrator of a networked system"—Any person that is authorized, among other things, to define or change at least one rule controlling at least one of an access right, a permission, a priority and a configuration in the networked system. Note that an administrator of a networked system may also be an administrator of one or more of the network nodes of the networked system.

46. "remote computing device" (with respect to a given networked system)—A computing device that executes software implementing part or all of the penetration testing software module that is used for testing the given networked system.

A remote computing device may be (i) outside of the given networked system, or (ii) inside the given networked system. In other words, a remote computing device is not necessarily physically remote from the given networked system. It is called "remote" to indicate its functionality is logically separate from the functionality of the given networked system.

A remote computing device may (i) be a dedicated computing device that is dedicated only to doing penetration testing, or (ii) also implement other functionality not directly related to penetration testing.

A remote computing device is not limited to be a single physical device with a single processing unit. It may be implemented by multiple separate physical devices packaged in separate packages that may be located at different locations. Each of the separate physical devices may include one or multiple processing units.

A remote computing device may be (i) a physical computing device, or (ii) a virtual machine running inside a physical computing device on top of a hosting operating system.

47. "damaging a file"—Changing the file in a way that the file cannot be recovered to its original form without having extra information. Examples of specific ways of damaging a file are (i) deleting the file, (ii) removing the first 100 bytes of the file, (iii) changing the order of bytes in the file (without removing any of them), (iv) encrypting the file using a secret key, etc.

Note that changing the access rights of a file is not considered damaging the file.

48. "explicitly selecting"—Directly and clearly selecting, by a human user, of one option out of multiple options available to human user, leaving no room for doubt and not relying on making deductions by a computing device.

Examples of explicit selections are (i) selection of a specific type of an attacker from a drop-down list of types, (ii) selection of specific one or more attacker capabilities by marking one or more check boxes in a group of multiple check boxes corresponding to multiple attacker capabilities, and (iii) reception for viewing by a user of a recommendation automatically computed by a computing device for a value of an information item and actively approving by the user of the recommendation for using the value, provided that the approving user has an option of rejecting the recommendation and selecting a different value for the information item.

Examples of selections that are not explicit selections are (i) selection of specific one or more attacker capabilities by selecting a specific scenario of a penetration testing system from a pre-defined library of scenarios, where the specific scenario includes an attacker having the one or more capabilities, and (ii) selection of specific one or more attacker capabilities by selecting a specific goal of an attacker, accompanied by a deduction by a computing device concluding that the specific one or more attacker capabilities must be selected because they are essential for the attacker to succeed in meeting the specific goal.

49. "automatically selecting"—Selecting, by a computing device, of one option out of multiple options, without receiving from a human user an explicit selection of the selected option. It should be noted that the selecting of an option is an automatic selecting even if the computing device is basing the selection on one or more explicit selections by the user, as long as the selected option itself is not explicitly selected by the user. It should also be noted that receiving from a user of an approval for a recommendation which is otherwise automatically selected without giving the user an ability to override the recommendation does not make the selection a non-automatic selection.

An example of an automatic selection is a selection by a computing device of one or more attacker capabilities by (a) receiving from a user an explicit selection of a specific scenario of a penetration testing system from a pre-defined library of scenarios, (b) determining by the computing device that the specific scenario includes an attacker having the one or more capabilities, and (c) deducing by the computing device that the user wants to select the one or more attacker capabilities.

An example of a selection that is not an automatic selection is a selection of a value for an information item by (a) calculating by a computing device of a recommended value for the information item, (b) displaying the recommendation to a user, and (c) receiving from the user an explicit approval to use the recommended value of the information item, provided that the approving user has an option of rejecting the recommendation and selecting a different value for the information item.

50. "defensive application"—A software application whose task is to defend the network node in which it is installed against potential attackers. A defensive application may be a passive defensive application, in which case it only detects and reports penetration attempts into its hosting network node but does not attempt to defend against the detected attacks. Alternatively, a defensive application may be an active defensive application, in which case it not only detects penetration attempts into its hosting network node but also attempts to defend its hosting node against the detected attacks by activating at least one counter-measure.

51. "user interface"—A man-machine interface that does at least one of (i) providing information to a user, and (ii) receiving input from the user. Towards this end, any user interface includes at least one of (i) an input device (e.g. touch-screen, mouse, keyboard, joystick, camera) for receiving input from the user, and (ii) an output device (e.g. display screen such as a touch-screen, speaker) for providing information to the user. A user interface typically also includes executable user-interface code for at least one of (i) causing the output device to provide information to the user (e.g. to display text associated with radio-buttons or with a check list, or text of a drop-down list) and (ii) processing user-input received via the input device. In different examples, the executable code may be compiled-code (e.g. in assembly or machine-language), interpreted byte-code (e.g. Java byte-code), or browser-executed code (e.g. JavaScript code) that may be sent to a client device from a remote server and then executed by the client device.

52. "user interface of a computing device"—A user interface that is functionally attached to the computing device and serves the computing device for interacting with the user.

An input device of a user interface of a computing device may share a common housing with the computing device (e.g. a touch-screen of a tablet), or may be physically separate from the computing device and be in communication with it, either through a physical port (e.g. a USB port) or wirelessly (e.g. a wireless mouse).

An output device of a user interface of a computing device may share a common housing with the computing device (e.g. a touch-screen of a tablet), or may be physically separate from the computing device and be in communication with it, either through a physical port (e.g. an HDMI port) or wirelessly.

User-interface code of a user interface of a computing device is stored in a memory accessible to the computing device and is executed by one or more processors of the computing device. In one example related to web-based user interfaces, at least some of this code may be received from a remote server and then locally executed by the computing device which functions as a client. In another example related to locally-implemented user interfaces, all of the user-interface code is pre-loaded onto the computing device.

53. "a time tag associated with a pre-defined scenario"—A data item assigned to a pre-defined scenario and representing a time-related Boolean condition applied to a given time. A time tag may have one of the following forms:
(i) A time interval, expressed by (1) a combination of a starting time and an ending time, (2) a combination of a starting time and a time duration, or (3) a combination of a time value and plus and minus tolerances. The Boolean condition is satisfied (is true) if and only if the given time is within the time interval.
(ii) A time point, expressed by a single time value. The Boolean condition is satisfied (is true) if and only if the given time is within a pre-defined tolerance of the time point.
(iii) A time interval, expressed either by a combination of a starting time and an ending time or by a combination of a starting time and a time duration. The Boolean condition is satisfied (is true) if and only if the given time is outside the time interval.
(iv) A time point, expressed by a single time value. The Boolean condition is satisfied (is true) if and only if the given time is not within a pre-defined tolerance of the time point.
(v) A special value indicating an "always true" value. The Boolean condition is always satisfied (always true).

A time tag may optionally also include repeatability information. The repeatability information may indicate one of: (i) there is no repeating, (ii) repeating every day, (iii) repeating every week, (iv) repeating every month, and (v) repeating every year. A time tag that includes repeatability information other than "there is no repeating" is said to be "a repeating time tag".

The meaning of the time information provided by a time interval or a time point of a time tag depends on the repeatability information of that time tag:
a. If there is no repeating, then the time information represents absolute calendar time and the time interval or time point occurs only once (e.g. 19:30 pm, Mar. 20, 2018).
b. If the repeatability information indicates repeating every day, then the time information represents time that is applicable to each day (e.g. 3:30 am).
c. If the repeatability information indicates repeating every week, then the time information represents time that is applicable to each week (e.g. 4:45 am, Thursday).
d. If the repeatability information indicates repeating every month, then the time information represents time that is applicable to each month (e.g. 7:30 pm, $25^{th}$ day of the month).
e. If the repeatability information indicates repeating every year, then the time information represents time that is applicable to each year (e.g. 6:30 am, March 17th).

54. "a time tag matching a given time"—A time tag whose Boolean condition is satisfied (is true) for the given time.

55. "setting a campaign to be based on a pre-defined scenario"—Selecting the values of the information items of the campaign at least partially according to the corresponding values of the information items of the pre-defined scenario. The setting includes assigning to every information item of the campaign the value of the corresponding information item of the pre-defined scenario. Optionally, after the assigning, the setting may further include manually overriding and changing one or more of the assigned values of the information items of the campaign.

56. "subset/subgroup of a given set/group" or "sub-set/sub-group of a given set/group"—A set/group that satisfies the condition that that every member of it is also a member of the given set/group. Unless otherwise stated, a subset/subgroup may be empty and contain no members at all. Unless otherwise stated, a subset/subgroup of a given set/group may contain all the members of the given set/group and be equal to the given set/group.

57. "proper subset/subgroup of a given set/group" or "proper sub-set/sub-group of a given set/group"—A subset/subgroup of the given set/group that is not equal to the given set/group. In other words, there is at least one member of the given set/group that is not a member of the subset/subgroup.

58. "or"—A logical operator combining two Boolean input conditions into a Boolean compound condition, such that the compound condition is satisfied if and only if at least one of the two input conditions is satisfied. In other words, if condition C=condition A or condition B, then condition C is not satisfied when both condition A and condition B are not satisfied, but is satisfied in each of the following cases: (i) condition A is satisfied and condition B is not satisfied, (ii) condition A is not satisfied and condition B is satisfied, and (iii) both condition A and condition B are satisfied.

The invention claimed is:

1. A method for penetration testing of a networked system by executing a penetration testing campaign by an automated penetration testing system that is controlled by a user interface of a computing device, the penetration testing campaign being based on a pre-defined penetration testing scenario template, the method comprising:
   a. determining, by the penetration testing system, a time at which the penetration testing campaign is scheduled to start execution;
   b. retrieving, by the penetration testing system, a first set of pre-defined penetration testing scenario templates from a storage device, wherein each given scenario template of the pre-defined penetration testing scenario templates in the first set is associated with a corresponding time tag representing a corresponding time-related Boolean condition which should be satisfied by a starting time of any penetration testing campaign that is based on the given scenario template;
   c. causing, by the penetration testing system, a first display device to display a second set of pre-defined penetration testing scenario templates, the second set being a subset of the first set, wherein each scenario template of the second set of pre-defined penetration testing scenario templates is associated with a corresponding time tag matching the time at which the penetration testing campaign is scheduled to start execution;

d. receiving, by the penetration testing system and via the user interface of the computing device, one or more manually-entered inputs, the one or more manually-entered inputs selecting one pre-defined penetration testing scenario template included in the second set, wherein the time tag associated with the selected one pre-defined penetration testing scenario template represents a time-related Boolean condition which determines a starting time and an ending time and is satisfied for the time at which the penetration testing campaign is scheduled to start execution;

e. setting the penetration testing campaign to be based on the one pre-defined penetration testing scenario template that is selected, by the one or more manually-entered inputs, from the second set of pre-defined penetration testing scenario templates;

f. at the time at which the penetration testing campaign is scheduled to start execution, starting executing the penetration testing campaign by the penetration testing system so as to test the networked system; and g. reporting, by the penetration testing system, at least one security vulnerability determined to exist in the networked system by the executing of the penetration testing campaign, wherein the reporting comprises at least one operation selected from the group consisting of (i) causing a second display device to display information about the at least one security vulnerability, (ii) recording information about the at least one security vulnerability in a file, and (iii) electronically transmitting information about the at least one security vulnerability.

2. The method of claim 1, wherein for each given pre-defined penetration testing scenario template in the first set, the given pre-defined penetration testing scenario template is included in the second set if and only if the given pre-defined penetration testing scenario template is associated with a time tag which matches the time at which the penetration testing campaign is scheduled to start execution.

3. The method of claim 1, further comprising causing, by the penetration testing system, the first display device to display at least one pre-defined penetration testing scenario template which is a member of the first set but is not a member of the second set, wherein each displayed pre-defined penetration testing scenario template that is a member of the first set but is not a member of the second set is marked on the first display device as not being selectable.

4. The method of claim 1, wherein the time at which the penetration testing campaign is scheduled to start execution is the current time.

5. The method of claim 1, wherein the determining of the time at which the penetration testing campaign is scheduled to start execution includes receiving via the user interface of the computing device one or more additional manually-entered inputs selecting the time at which the penetration testing campaign is scheduled to start execution.

6. The method of claim 1, wherein the setting of the penetration testing campaign to be based on the selected one pre-defined penetration testing scenario template includes assigning every information item of the penetration testing campaign a value taken from the corresponding information item of the selected one pre-defined penetration testing scenario template.

7. The method of claim 1, wherein the setting of the penetration testing campaign to be based on the selected one pre-defined penetration testing scenario template includes, for at least one information item of the penetration testing campaign, receiving a value for the one information item, wherein the receiving of the value is from a user of the penetration testing system and via the user interface of the computing device, and the receiving of the value is subsequent to the selecting of the one pre-defined penetration testing scenario template.

8. The method of claim 1, wherein (i) the time tag with which the selected one pre-defined penetration testing scenario template is associated has the form of a time interval, and (ii) the time tag with which the selected one pre-defined penetration testing scenario template is associated includes one member selected from the group consisting of (A) a starting time and an ending time, (B) a starting time and a time duration, and (C) a time value and plus and minus tolerances.

9. The method of claim 1, wherein the time tag with which the selected one pre-defined penetration testing scenario template is associated has the form of a time point.

10. The method of claim 1, wherein the time tag with which the selected one pre-defined penetration testing scenario template is associated is a repeating time tag.

11. The method of claim 1, further comprising:
a. detecting a continuance of the executing of the penetration testing campaign until the Boolean condition represented by the time tag associated with the selected one pre-defined penetration testing scenario template becomes not satisfied; and
b. in response to the detecting, automatically terminating the executing of the penetration testing campaign.

12. A penetration testing system for testing a networked system by executing a penetration testing campaign, the penetration testing campaign being based on a pre-defined penetration testing scenario template, the system comprising:
a. a computing device including one or more computer processors;
b. a non-transitory computer-readable storage medium storing program instructions, wherein the program instructions are for execution by the one or more computer processors and wherein the stored program instructions comprise:
   i. first program instructions for determining a time at which the penetration testing campaign is scheduled to start execution,
   ii. second program instructions for retrieving a first set of pre-defined penetration testing scenario templates from a storage device, wherein each given scenario template of the pre-defined penetration testing scenario templates in the first set is associated with a corresponding time tag representing a corresponding time-related Boolean condition which should be satisfied by a starting time of any penetration testing campaign that is based on the given scenario template,
   iii. third program instructions for causing a first display device to display a second set of pre-defined penetration testing scenario templates, the second set being a subset of the first set, wherein each scenario template of the second set of pre-defined penetration testing scenario templates is associated with a corresponding time tag matching the time at which the penetration testing campaign is scheduled to start execution, iv. fourth program instructions for receiving, via a user interface of the computing device, one or more manually-entered inputs, the one or more manually-entered inputs selecting one pre-defined penetration testing scenario template included in the second set, wherein the time tag associated with the selected one pre-defined penetration testing scenario template represents a time-related Boolean condition which determines a starting time and an ending time and is satisfied for the time at which the penetration testing campaign is scheduled to start execution, v. fifth program instructions for setting the penetration testing campaign to be based on the one pre-defined penetration testing scenario template that is selected, by the one or more manually-entered inputs, from the second set of pre-defined penetration testing scenario templates, vi. sixth program instructions for starting executing the penetration testing campaign at the time at which the penetration testing campaign is scheduled to start execution, so as to test the networked system, and vii. seventh program instructions for reporting at least one security vulnerability determined to exist in the networked system by the executing of the penetration testing campaign, wherein the reporting comprises at least one operation selected from the group consisting of (i) causing a second display device to display information about the at least one security vulnerability, (ii) recording information about the at least one security vulnerability in a file, and (iii) electronically transmitting information about the at least one security vulnerability.

13. A method for executing a penetration testing campaign in a networked system, using an automated penetration testing system, wherein (i) the automated penetration testing system includes a library of multiple pre-defined test scenario templates associated with respective time tags, wherein, for each given pre-defined test scenario template in the library, the respective time tag to which the given pre-defined test scenario template is associated represents a respective time-related Boolean condition which should be satisfied by a starting time of any penetration testing campaign that is based on the given pre-defined test scenario template, (ii) the penetration testing campaign is to be based on a pre-defined penetration test scenario template from the library, and (iii) the penetration testing campaign is scheduled to start at a specific start time, the method comprising:

a. displaying, by a first display device, multiple pre-defined test scenario templates from the library whose respective time tags match the specific start time, wherein:
  (i) the displaying enables a selection of a pre-defined test scenario template by a user of the automated penetration testing system, and
  (ii) pre-defined test scenarios templates from the library whose respective time tags do not match the specific start time are either not displayed by the first display device or are displayed by the first display device but are not selectable by the user;

b. receiving the selection by the user of one pre-defined test scenario template included in the multiple pre-defined test scenario templates, using a user interface of the automated penetration testing system, wherein the time tag associated with the selected one pre-defined test scenario template represents a time-related Boolean condition which determines a starting time and an ending time and is satisfied for the specific start time;

c. setting the penetration testing campaign to be based on the one pre-defined test scenario template that is selected by the user from the multiple pre-defined test scenario templates;

d. at the specific start time, starting executing of the penetration testing campaign by the automated penetration testing system so as to test the networked system; and e. reporting at least one security vulnerability determined to exist in the networked system by the executing of the penetration testing campaign, the reporting comprising at least one operation selected from the group consisting of:
  (i) causing a second display device to display information about the at least one security vulnerability, (ii) recording information about the at least one security vulnerability in a file, and (iii) electronically transmitting information about the at least one security vulnerability.

14. The method of claim 13, wherein the specific start time at which the penetration testing campaign is scheduled to start execution is the current time.

15. The method of claim 13, wherein the specific start time at which the penetration testing campaign is scheduled to start execution is received by the automated penetration testing system via the user interface of the automated penetration testing system.

16. The method of claim 13, wherein (i) the respective time tag with which the selected one pre-defined test scenario template is associated has the form of a time interval, and (ii) the respective time tag with which the selected one pre-defined test scenario template is associated includes one member selected from the group consisting of (A) a starting time and an ending time, (B) a starting time and a time duration, and (C) a time value and plus and minus tolerances.

17. The method of claim 13, wherein the respective time tag with which the selected one pre-defined test scenario template is associated has the form of a time point.

18. The method of claim 13, wherein the respective time tag with which the selected one pre-defined test scenario template is associated is a repeating time tag.

19. The method of claim 13, further comprising:
a. detecting a continuance of the executing of the penetration testing campaign until the Boolean condition represented by the time tag associated with the selected one pre-defined test scenario template becomes not satisfied; and
b. in response to the detecting, automatically terminating the executing of the penetration testing campaign.

20. A system for executing a penetration testing campaign of a networked system, wherein the penetration testing campaign is to be based on a pre-defined test scenario template and is scheduled to start at a specific start time, the system comprising:
a. a first non-transitory computer-readable storage medium comprising a library of pre-defined test scenario templates, each test scenario template associated with a respective time tag, wherein, for each given pre-defined test scenario template in the library, the respective time tag to which the given pre-defined test scenario template is associated represents a respective time-related Boolean condition which should be satisfied by a starting time of any penetration testing campaign that is based on the given pre-defined test scenario template;
b. a computing device, comprising:
 i. one or more computer processors, and
 ii. a user interface module comprising a first display device for (A) displaying multiple test scenario templates from the library and (B) enabling user selection of one of the multiple test scenario templates, such that test scenario templates from the library whose respective time tags match the scheduled specific start time are displayed and are selectable by the user, and test scenario templates from the library whose respective time tags do not match the scheduled specific start time are either not displayed or are displayed but are not selectable by the user; and
c. a second non-transitory computer-readable storage medium storing program instructions, wherein the program instructions are for execution by the one or more computer processors and wherein the stored program instructions comprise:
 (i) first program instructions for receiving the user selection of the one pre-defined test scenario template, wherein the time tag associated with the selected one pre-defined test scenario template represents a time-related Boolean condition which determines a starting time and an ending time and is satisfied for the scheduled specific start time,
 (ii) second program instructions for setting the penetration testing campaign to be based on the pre-defined test scenario template that is selected by the user from the multiple test scenario templates,
 (iii) third program instructions for starting executing the penetration testing campaign at the scheduled specific start time, so as to test the networked system, and
 (iv) fourth program instructions for reporting at least one security vulnerability determined to exist in the networked system by the executing of the penetration testing campaign, wherein the reporting comprises at least one operation selected from the group consisting of (i) causing a second display device to display information about the at least one security vulnerability, (ii) recording information about the at least one security vulnerability in a file, and (iii) electronically transmitting information about the at least one security vulnerability.

* * * * *